# (12) United States Patent
Gotou et al.

(10) Patent No.: US 7,780,221 B2
(45) Date of Patent: Aug. 24, 2010

(54) CLUTCH, MOTOR DEVICE, AND VEHICLE DOOR OPENING AND CLOSING APPARATUS

(75) Inventors: Chikara Gotou, Kosai (JP); Tomoaki Ozaki, Kosai (JP); Satoshi Ohta, Kosai (JP); Masaaki Shimizu, Kosai (JP)

(73) Assignee: ASMO Co., Ltd. (JP)

( * ) Notice: Subject to any disclaimer, the term of this patent is extended or adjusted under 35 U.S.C. 154(b) by 786 days.

(21) Appl. No.: 11/697,215

(22) Filed: Apr. 5, 2007

(65) Prior Publication Data

US 2007/0283628 A1 Dec. 13, 2007

(30) Foreign Application Priority Data

| Apr. 6, 2006 | (JP) | ............................. 2006-105222 |
| Apr. 6, 2006 | (JP) | ............................. 2006-105223 |
| Nov. 1, 2006 | (JP) | ............................. 2006-297948 |

(51) Int. Cl.
*B60J 5/00* (2006.01)
(52) U.S. Cl. ............................. 296/146.4; 192/105 BA
(58) Field of Classification Search .............. 296/146.4; 192/84.961, 150, 105 CD, 38, 48.2, 48.3, 192/48.91, 105 B
See application file for complete search history.

(56) References Cited

U.S. PATENT DOCUMENTS

| 3,414,097 | A |   | 12/1968 | Denkowski | |
|---|---|---|---|---|---|
| 3,505,888 | A |   | 4/1970 | Denkowski | |
| 3,768,611 | A | * | 10/1973 | Frederickson | ......... 192/105 BA |
| 3,893,553 | A | * | 7/1975 | Hansen | ......................... 192/150 |
| 3,971,463 | A | * | 7/1976 | Zindler | ................. 192/105 BA |
| 4,866,458 | A | * | 9/1989 | Kimura | ....................... 343/903 |
| 5,437,356 | A | * | 8/1995 | Lohr | .................... 192/105 BA |
| 5,495,904 | A | * | 3/1996 | Zwaan et al. | ................... 180/11 |
| 5,503,261 | A | * | 4/1996 | Schultz | ................. 192/105 CD |
| 6,000,512 | A | * | 12/1999 | Cronin et al. | ................. 192/38 |
| 6,242,824 | B1 | * | 6/2001 | Torii et al. | ................... 310/420 |

(Continued)

FOREIGN PATENT DOCUMENTS

JP 2002327576 11/2002

OTHER PUBLICATIONS

USPTO Office Action, dated May 3, 2010, from U.S. Appl. No. 12/137,921, filed Jun. 12, 2008.

*Primary Examiner*—Kiran B. Patel
(74) *Attorney, Agent, or Firm*—Fulwider Patton LLP

(57) ABSTRACT

When a drive shaft is in a non-drive state, a second drive rotor is in a non-engaged state with a driven rotor with respect to its own rotating direction. When the drive shaft is in a drive state, a rotating force of a first drive rotor is transmitted to the second drive rotor through an urging member. As a result, a power transmitting member revolves, and a centrifugal force arranges the power transmitting member at a second clamping position. The second drive rotor receives a reaction force from a driven rotor via the power transmitting member. As a result, the second drive rotor is relatively rotated in an opposite direction to a rotating direction of the first drive rotor with respect to the first drive rotor, against an urging force of the urging member. As a result, the first drive rotor is engaged with the driven rotor with respect to its own rotating direction. Accordingly, the clutch is stably operated.

7 Claims, 23 Drawing Sheets

U.S. PATENT DOCUMENTS

| | | |
|---|---|---|
| 6,516,929 B1 | 2/2003 | Baniak |
| 6,700,245 B2 * | 3/2004 | Yamamura et al. ............ 192/38 |
| 7,021,446 B2 * | 4/2006 | Edwards et al. ....... 192/105 BA |
| 2007/0283628 A1 | 12/2007 | Gotou |

* cited by examiner

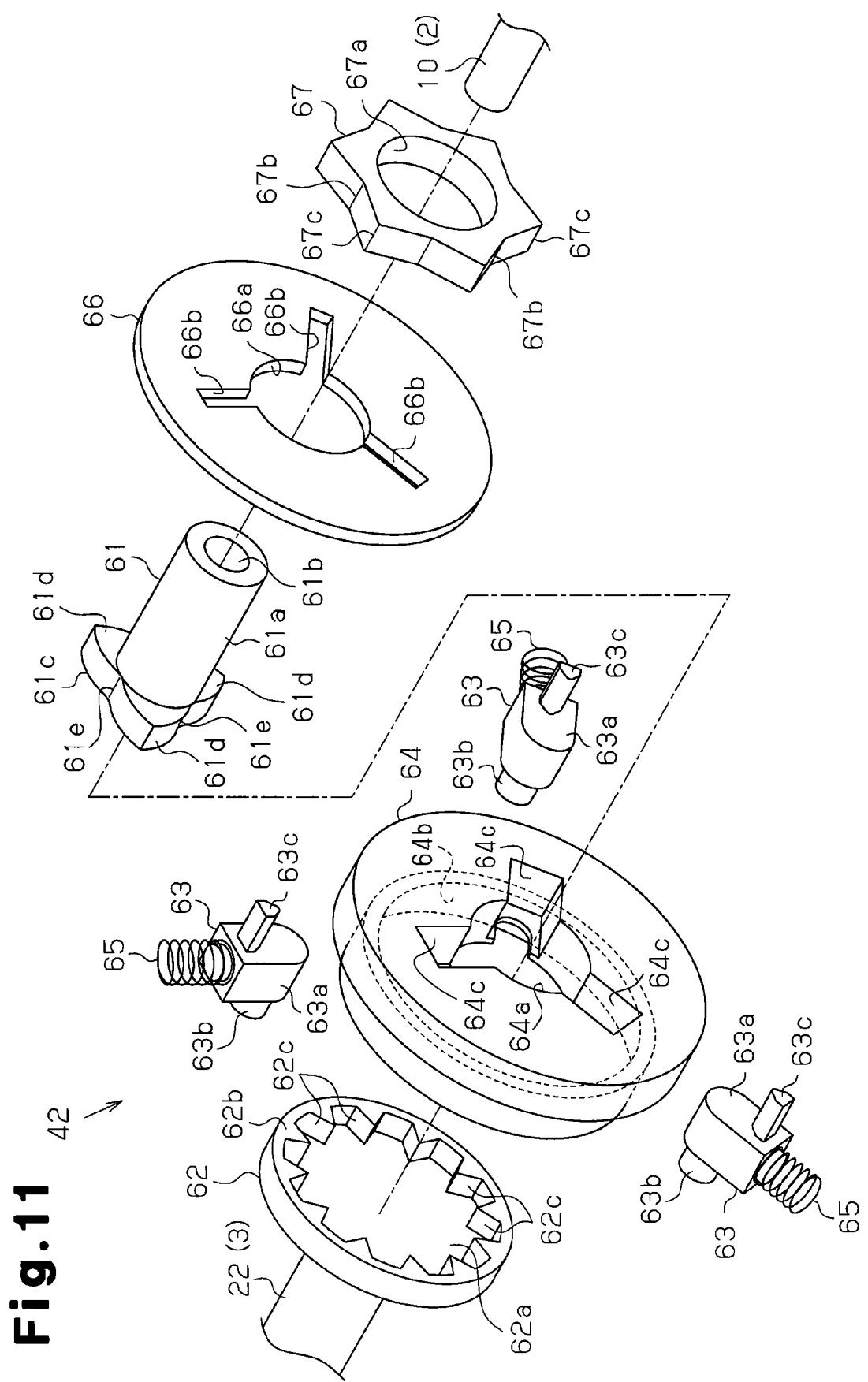

CLUTCH, MOTOR DEVICE, AND VEHICLE DOOR OPENING AND CLOSING APPARATUS

BACKGROUND OF THE INVENTION

The present invention relates to a clutch, a motor provided with the clutch, and a vehicle door opening and closing apparatus provided with the motor. The vehicle door opening and closing apparatus includes a vehicle slide door opening and closing apparatus and a vehicle backdoor opening and closing apparatus. The motor can serve as a drive source of the vehicle door opening and closing apparatus.

In recent years, there have been cases in which a motor vehicle has a slide door opening and closing apparatus. The slide door opening and closing apparatus has a motor device serving as a drive source for driving a slide door. The slide door opens and closes a door opening provided in a side portion of a vehicle body. The motor device is provided with a motor main body having a stator and an armature, and a speed reducing mechanism decelerating a rotation output by the motor main body. An output from the speed reducing mechanism drives the slide door.

It is necessary that the slide door opening and closing apparatus allow the slide door to open and close in accordance with a manual operation. Japanese Laid-Open Patent Publication No. 2002-327576 proposes a door opening and closing apparatus equipped with an electromagnetic clutch in an output shaft extending from the speed reducing mechanism.

In the publication mentioned above, when the motor device drives the slide door, the electromagnetic clutch is turned on. Accordingly, the electromagnetic clutch couples a rotating shaft extending from the armature to a worm wheel. Therefore, a rotating force output from the motor main body is transmitted to the worm wheel, and the slide door is automatically opened and closed in accordance with an electric motor control. In the case of manually operating the slide door, the electromagnetic clutch is turned off. Accordingly, the electromagnetic clutch shuts off the rotating shaft from the worm wheel, and allows the manual operation of the slide door.

However, it is complicated to arrange a wiring for supplying electricity to the electromagnetic clutch. Therefore, a mechanical clutch is desired. The mechanical clutch is demanded to be stably actuated at a time of coupling a drive shaft to a driven shaft and at a time of shutting off the drive shaft from the driven shaft.

SUMMARY OF THE INVENTION

An objective of the present invention is to provide a stably operating clutch, a motor using the clutch, and a vehicle door opening and closing apparatus provided with the motor.

In accordance with one aspect of the present invention, there is provided a clutch arranged between a drive shaft and a driven shaft. The driven shaft is arranged coaxially with the drive shaft. When the drive shaft is in a drive state, the clutch couples the drive shaft to the driven shaft. When the drive shaft is in a non-drive state, the clutch shuts off the driven shaft from the drive shaft. The clutch includes a first drive rotor which is integrally rotatable with the drive shaft. The first drive rotor is arranged coaxially with the drive shaft. The clutch includes a second drive rotor provided coaxially with the first drive rotor, and an urging member arranged between the first drive rotor and the second drive rotor. The urging member holds the second drive rotor at a predetermined relative rotational position with respect to the first drive rotor. The clutch includes a driven rotor which is integrally rotatable with the driven shaft. The driven rotor is arranged coaxially with the driven shaft. A power transmitting member is arranged between the first drive rotor and the driven rotor, and between the second drive rotor and the driven rotor, with respect to a radial direction. The power transmitting member is movable among a first clamping position, a second clamping position and a non-engaging position. The non-engaging position exists in an inner side in a radial direction than the first clamping position and the second clamping position. The first drive rotor and the driven rotor clamps the power transmitting member located at the first clamping position. The second drive rotor and the driven rotor clamp the power transmitting member located at the second clamping position. The first drive rotor and the driven rotor do not clamp the power transmitting member located at the non-engaging position. The second drive rotor and the driven rotor do not clamp the power transmitting member located at the non-engaging position. When the drive shaft is in a non-drive state, the power transmitting member exists at the non-engaging position. As a result, the second drive rotor is in a non-engaging state with the driven rotor with respect to its own rotating direction. When the drive shaft is in a drive state, a rotating force of the first drive rotor is transmitted to the second drive rotor through the urging member. As a result, the second drive rotor is rotated, and the power transmitting member revolves accordingly. A centrifugal force caused by the revolution arranges the power transmitting member at the second clamping position. The second drive rotor receives a reaction force from the driven rotor via the power transmitting member. As a result, the second drive rotor is relatively rotated in an opposite direction to the rotating direction of the first drive rotor with respect to the first drive rotor, against the urging force of the urging member. The power transmitting member is arranged at the first clamping position. As a result, the first drive rotor is engaged with the driven rotor with respect to its own rotating direction.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 11 is an exploded perspective view of the second clutch shown in FIG. 10;

FIGS. 13A to 17A are cross-sectional views showing operations of the drive disc, the driven rotor, and the first contact protrusion shown in FIG. 12A;

FIGS. 13B to 17B are cross-sectional views showing operations of the fixed gear, and the second contact protrusion shown in FIG. 12B;

FIGS. 21A to 25A are cross-sectional views showing operations of the drive disc, the driven rotor and the first contact protrusion shown in FIG. 20A;

FIGS. 21B to 25B are cross-sectional views showing operations of the fixed gear and the second contact protrusion shown in FIG. 20B;

FIGS. 30A to 32A are side elevational views explaining an operation of the fourth clutch shown in FIG. 29A; and FIGS. 30B to 32B are cross-sectional views explaining the operation of the fourth clutch shown in FIG. 29B.

DETAILED DESCRIPTION OF PREFERRED EMBODIMENTS

A description will be given below of a first embodiment of the present invention with reference to FIGS. 1 to 8.

Figure 1:
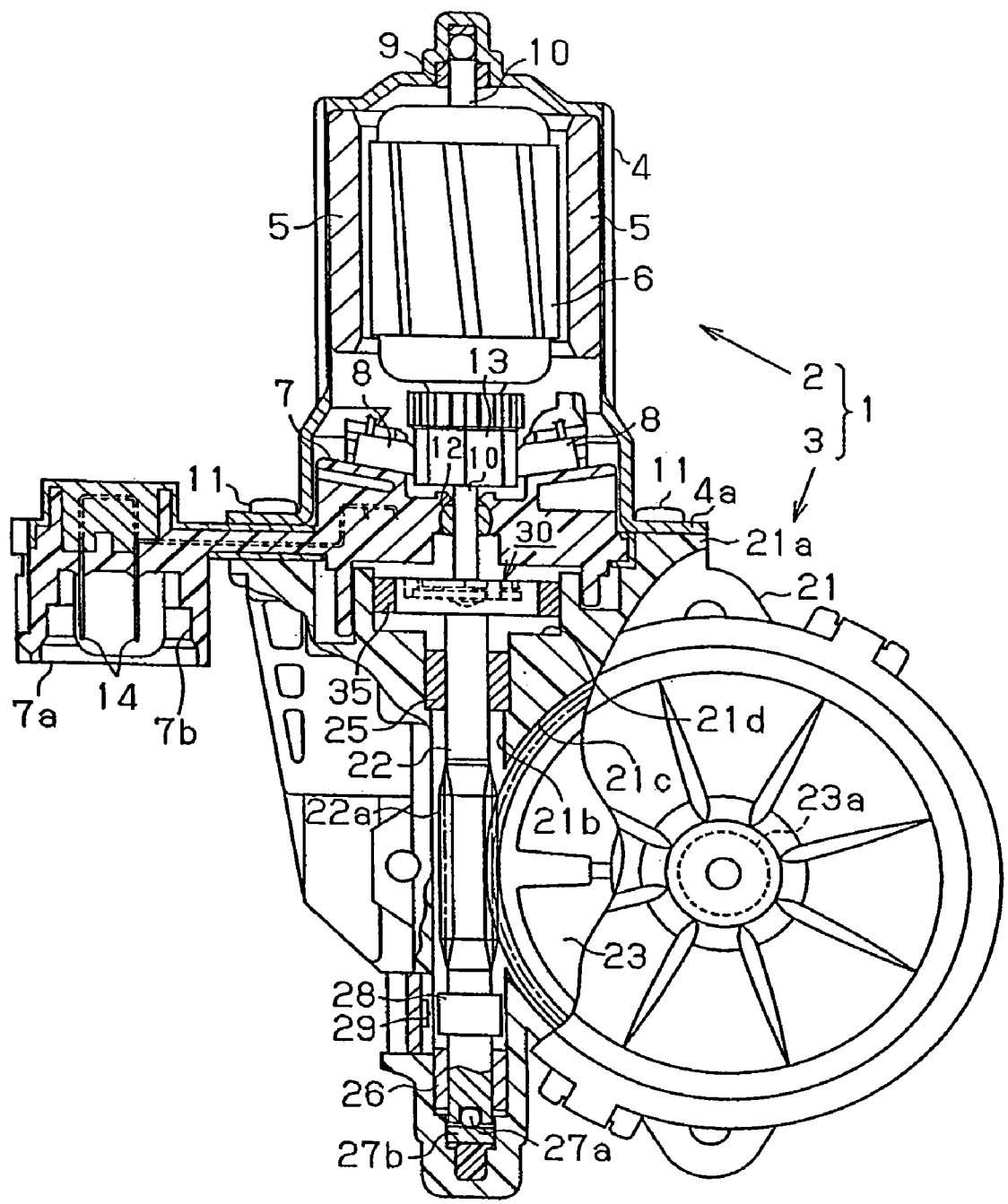
FIG. 1 is a vertical cross-sectional view of a motor device including a first clutch in accordance with a first embodiment of the present invention.
Figure 8:
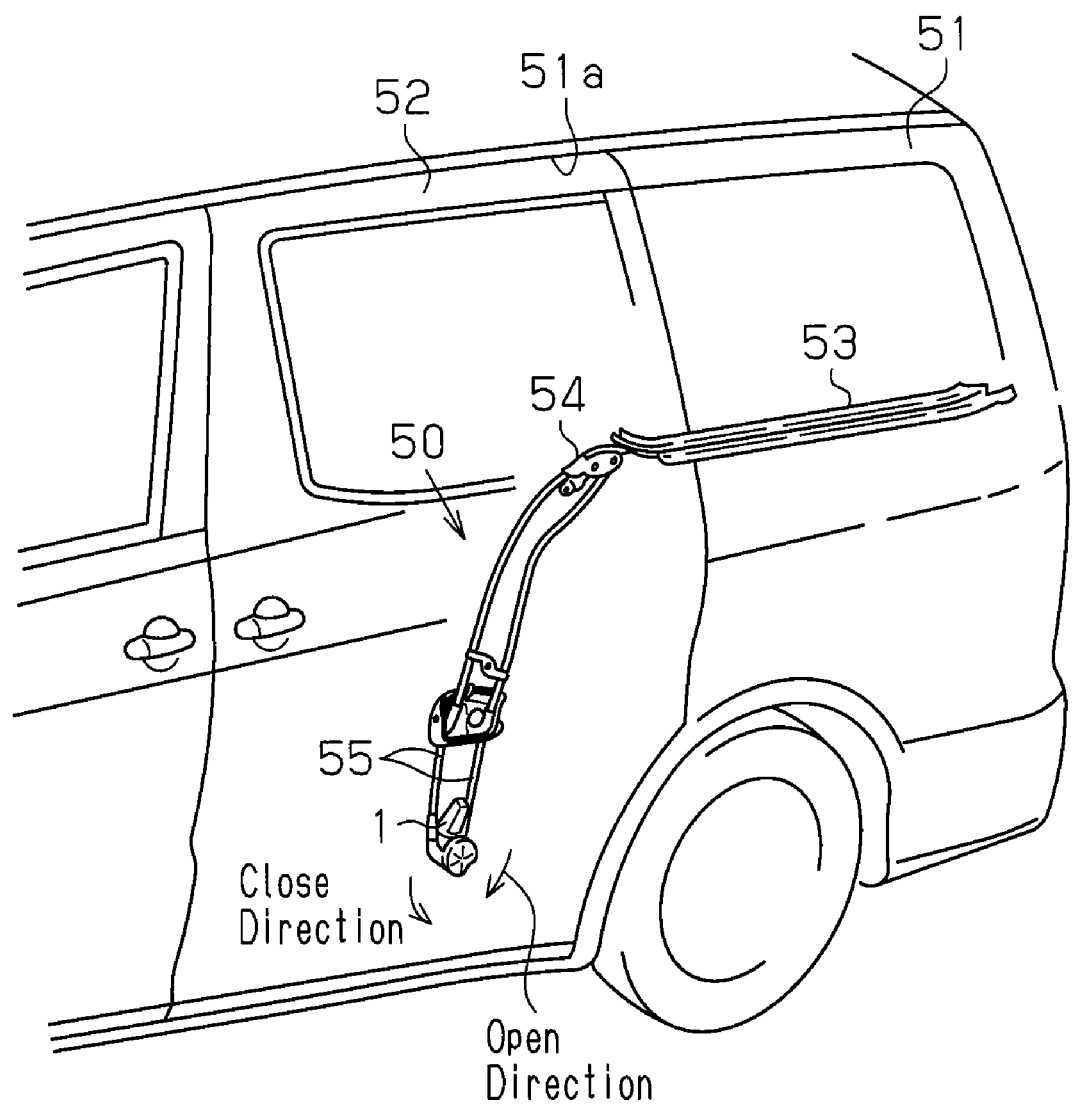
FIG. 8 is a schematic perspective view of a slide door opening and closing apparatus including the motor device shown in FIG. 1.

FIG. 1 shows a motor device 1 in accordance with a first embodiment. FIG. 8 shows a door opening and closing apparatus 50 mounted to a motor vehicle. The motor device 1 serves as a drive source of the door opening and closing apparatus 50 operating a slide door 52. As shown in FIG. 8, a side surface of a vehicle body 51 has a door opening 51a corresponding to an opening, a guide rail 53, and a slide door 52 opening and closing the door opening 51a. A coupler 54 supports the slide door 52 with respect to a guide rail 53. The door opening and closing apparatus 50 is arranged in an inner portion of the slide door 52. The motor device 1 takes up or discharge a wire cable 55 with respect to the coupler 54. As a result, the slide door 52 moves along the guide rail 53.

As shown in FIG. 1, the motor device 1 has a motor main body 2, and a speed reducing mechanism 3 decelerating a rotation output from the motor main body 2. The motor main body 2 serving as a geared motor is provided with a yoke housing 4, a pair of magnets 5, an armature 6, a brush holder 7, and a pair of brushes 8. The armature 6 is provided with a rotary shaft 10, and a commutator 13 firmly attached to the rotary shaft 10.

The yoke housing 4 is formed in a flat closed-end cylindrical shape. The magnet 5 is firmly attached to an inner surface of the yoke housing 4. A first bearing 9 is arranged in a center of a bottom portion of the yoke housing 4. The first bearing 9 rotatably supports the rotary shaft 10 serving as the drive shaft. The motor device 1 has a first bearing 9, a second bearing 12, a third bearing 25, and a fourth bearing 26 in the order facing the speed reducing mechanism 3 from the motor main body 2. The first bearing 9 and the second bearing 12 rotatably support the rotary shaft 10. The third bearing 25 and the fourth bearing 26 rotatably support a worm shaft 22 in the speed reducing mechanism 3. A fifth bearing 35 is positioned between the second bearing 12 and the third bearing 25. The rotary shaft 10 serves as a drive shaft. The worm shaft 22 serves as a driven shaft. The worm shaft 22 can also serve as an input shaft in the speed reducing mechanism 3.

The yoke housing 4 has a flange-shaped yoke opening portion 4a. The speed reducing mechanism 3 has a gear housing 21 made of a resin. The gear housing 21 has a gear opening portion 21a facing the yoke opening portion 4a. The yoke opening portion 4a is fixed to the gear opening portion 21a by a plurality of screws 11. The yoke opening portion 4a and the gear opening portion 21a clamp the brush holder 7. The brush holder 7 and the gear housing 21 can serve as a mounted body to which the fifth bearing 35 can be attached.

The brush holder 7 holds the second bearing 12 and a pair of brushes 8. The second bearing 12 rotatably supports a distal end of the rotary shaft 10 within the yoke housing 4. The brush 8 is brought into slidable contact with the commutator 13. The brush holder 7 has a motor connector 7a. The motor connector 7a protrudes from both of the yoke housing 4 and the gear housing 21. The motor connector 7a is coupled to a vehicle body side connector (not shown) extending from a vehicle body. The motor connector 7a is provided with a recess 7b, and a plurality of terminals 14 exposing to an inner portion of the recess 7b. The terminals 14 are inserted to the brush holder 7. The respective terminals 14 are electrically connected to the corresponding brush 8 and Hall element 29. The Hall element 29 serves as a rotary sensor provided in an inner portion of the motor device 1. The motor connector 7a is coupled to a vehicle body side connector, whereby the motor device 1 is electrically connected to a controller (not shown) serving as a motor control device provided in the vehicle body. Accordingly, a power supply is executed to the motor device 1 from the vehicle body. An output of a sensor signal is executed between the vehicle body and the motor device 1.

The speed reducing mechanism 3 is provided with a worm shaft 22, a worm wheel 23, an output shaft 23a and a first clutch 30. The gear housing 21 accommodates the worm shaft 22, the worm wheel 23 and the first clutch 30.

The gear housing 21 is provided with a shaft accommodating cylinder 21b, a wheel accommodating recess 21c, and a clutch accommodating recess 21d. The shaft accommodating cylinder 21b is formed in a cylindrical shape extending in an axial direction from the gear opening portion 21a for accommodating the worm shaft 22. The wheel accommodating recess 21c communicates the shaft accommodating cylinder 21b for accommodating the worm wheel 23. The clutch accommodating recess 21d is formed in the shaft accommodating cylinder 21b in such a manner as to be adjacent to the motor main body 2 for accommodating the first clutch 30.

The shaft accommodating cylinder 21b has the third bearing 25 and the fourth bearing 26. The third bearing 25 rotatably supports a first end of the worm shaft 22, and the fourth bearing 26 rotatably supports a second end of the worm shaft 22. The worm shaft 22 has a worm portion 22a positioned between the third bearing 25 and the fourth bearing 26. The worm shaft 22 is inserted to the shaft accommodating cylinder 21b from an opening of the shaft accommodating cylinder 21b. The worm shaft 22 is arranged coaxially with the rotary shaft 10. The second end of the worm shaft 22 is provided with a thrust bearing ball 27a receiving a thrust load of the worm shaft 22 and a plate 27b. The thrust bearing ball 27a reduces a rotary load of the output shaft 23a by making a rotary load of the worm shaft 22 small.

A ring-shaped sensor magnet 28 is firmly attached to the worm shaft 22 in such a manner as to be integrally rotatable. The sensor magnet 28 is positioned between the worm portion 22a and the fourth bearing 26. The sensor magnet 28 is multipolar magnetized in a circumferential direction. The Hall element 29 is arranged in the shaft accommodating cylinder 21b. The Hall element 29 faces an outer circumferential surface of the sensor magnet 28. The Hall element 29 detects a rotation information such as a rotational position and a rotating speed of the worm shaft 22, by detecting a magnetic field change accompanying with the rotation of the sensor magnet 28. In other words, the Hall element 29 detects an opening and closing position and an opening and closing speed of the slide door 52.

The worm wheel 23 engaged with the worm portion 22a is rotatably accommodated in the wheel accommodating recess 21c. The output shaft 23a is coupled to the worm wheel 23 in such a manner as to be integrally rotated. A drive pulley (not shown) around which a wire cable 55 for actuating so as to open and close the slide door 52 is wound is coupled to the output shaft 23a in such a manner as to be integrally rotated.

The first clutch 30 mechanically switches between a state in which the worm shaft 22 is shut off from the rotary shaft 10, and a state in which the rotary shaft 10 is coupled to the worm shaft 22. As shown in FIGS. 2 to 5, the first clutch 30 includes a first drive rotor 31, a driven cylinder 32, three roller members 33, and a second drive rotor 34. The first drive rotor 31 serving as a drive coupling body is coupled to the rotary shaft 10. The driven cylinder 32 serves as a driven rotor coupled to the worm shaft 22. Each of the roller members 33 serves as a power transmitting member arranged between the first drive rotor 31 and the driven cylinder 32. The second drive rotor 34 serves as an intermediate plate.

The first drive rotor 31 is integrally formed in a distal end of the rotary shaft 10. The structure is not limited to this, but the first drive rotor 31 may be formed as an independent member from the rotary shaft 10, and may be structured such as to couple the first drive rotor 31 to the rotary shaft 10. The disc-shaped first drive rotor 31 is arranged coaxially with the rotary shaft 10. The first drive rotor 31 is provided with three first drive surfaces 31a having the same shape at an equal interval (at an interval of 120 degrees) in a circumferential direction. Each of three first drive surfaces 31a serving as a control surface is formed in a V shape which is recessed shallowly to an inner side in a radial direction from an outer circumferential surface of the first drive rotor 31. Each of the first drive surfaces 31a includes a pair of first drive inclined surfaces 31b serving as a pair of first clamping surfaces. A pair of first drive inclined surfaces 31b are symmetrical with each other with respect to a radial line extending in a radial direction from a rotation center O of the rotary shaft 10 and the worm shaft 22. An angle between a pair of first drive inclined surfaces 31b, that is, a center angle of the first drive surface 31a is larger than 60 degrees.

Figure 4:
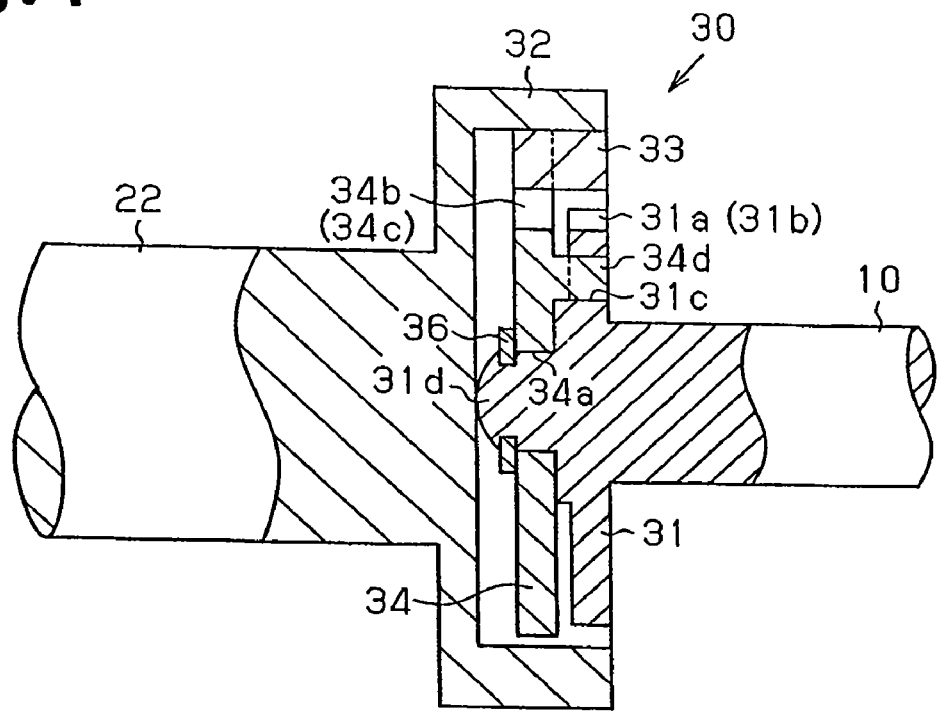
FIG. 4 is a vertical cross-sectional view of the first clutch shown in FIG. 2.

An outer circumferential surface of the first drive rotor 31 has three guide grooves 31c having the same shape and an equal interval on a concentric circle around the rotation center O. Each of the guide grooves 31c is formed in an arcuate shape extending in a circumferential direction, and corresponds to each of the first drive surfaces 31a. A radial dimension, that is, a width of the guide groove 31c is constant over the circumferential direction. As shown in FIG. 4, a shaft support portion 31d is extended toward the worm shaft 22 from the first drive rotor 31. The shaft support portion 31d is formed in a columnar shape which is coaxial with the rotary shaft 10. A distal end surface of the shaft support portion 31d is formed in a semispherical shape. The shaft support portion 31d has a groove to which a lock ring 36 is fitted.

Figure 2:
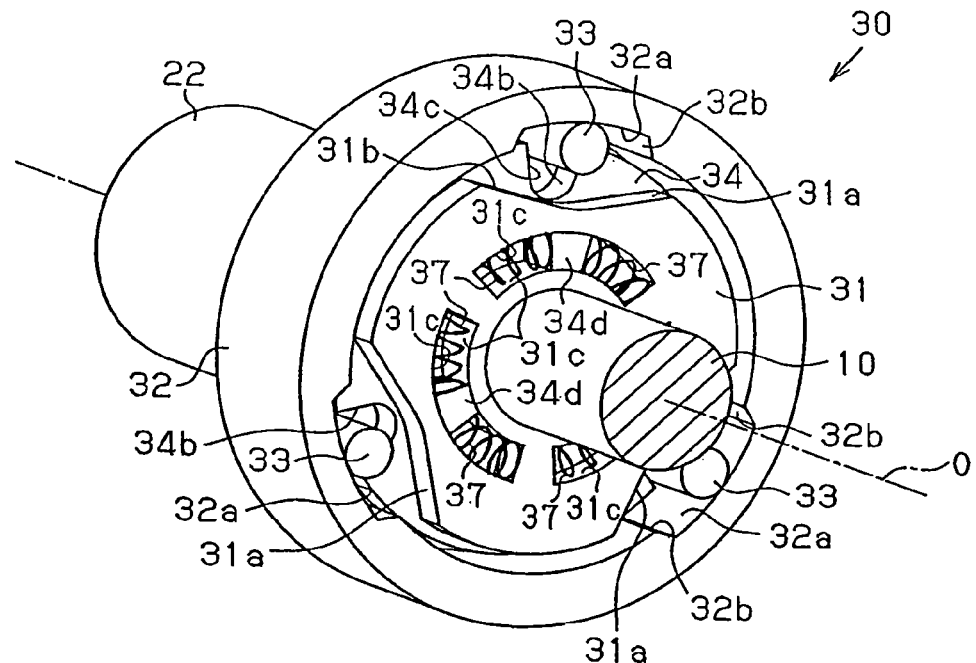
FIG. 2 is a perspective view of the first clutch shown in FIG. 1.
Figure 3:
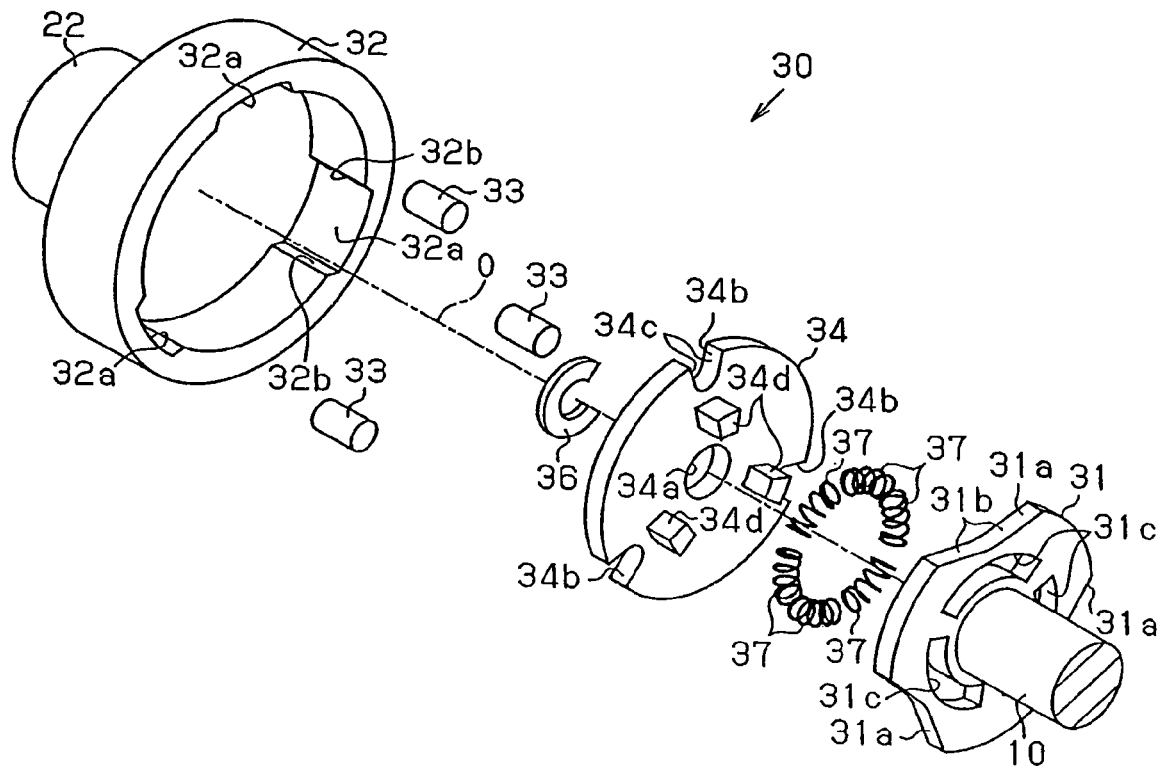
FIG. 3 is an exploded perspective view of the first clutch shown in FIG. 2.

As shown in FIG. 3, the driven cylinder 32 is integrally formed in an end portion of the worm shaft 22. The driven cylinder 32 may be structured detachable from the worm shaft 22 by modifying the structure mentioned above. The driven cylinder 32 is arranged coaxially with the worm shaft 22. As shown in FIG. 2, the first drive rotor 31 is arranged in an inner portion of the driven cylinder 32. An inner circumferential surface of the driven cylinder 32 faces the first drive surface 31a. Three driven recesses 32a are provided in the inner circumferential surface of the driven cylinder 32 at a uniform interval in the circumferential direction. Each of the driven recesses 32a is open so as to be spread toward an inner side in a radial direction, and is formed in the same shape with each other. The center angle of the driven recess 32a is smaller than 60 degrees. Each of both side walls of the driven recess 32a serves as a driven inclined surface 32b corresponding to a driven clamping surface. A pair of driven inclined surfaces 32b are symmetrical with each other with respect to a radial line extending in a radial direction from the rotation center O. The driven cylinder 32 is rotatably supported to the gear housing 21 by the fifth bearing 35 positioned in the clutch accommodating recess 21d.

Three roller members 33 are formed in a columnar shape extending in the axial direction of the rotary shaft 10, and are formed in the same shape with each other.

Figure 5:
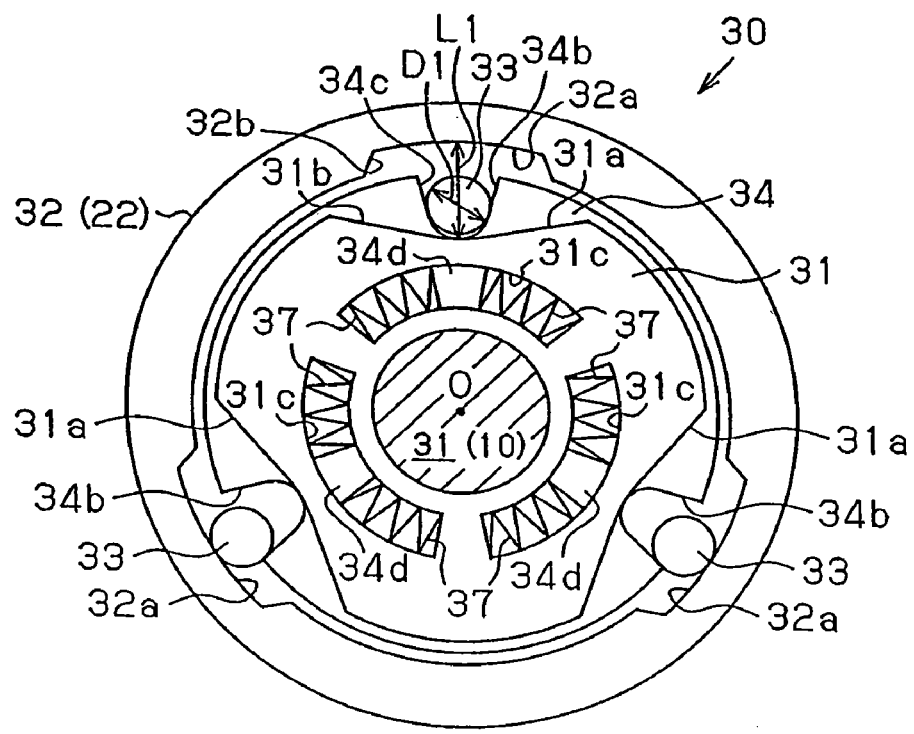
FIG. 5 is a plan view of the first clutch shown in FIG. 2.

The second drive rotor 34 is formed in a disc shape having the same diameter as the first drive rotor 31. A center portion of the second drive rotor 34 has a support hole 34a. The lock ring 36 is locked to the shaft support portion 31d passing through the support hole 34a, whereby the second drive rotor 34 is supported to the first drive rotor 31 so as to be relatively rotatable. The lock ring 36 prevents the second drive rotor 34 from falling away from the first drive rotor 31. An outer circumferential surface of the second drive rotor 34 has three second drive recesses 34b at a uniform interval in the circumferential direction. Each of the second drive recesses 34b is formed in a U shape extending to an inner side in a radial direction, and has the same shape with each other. Each of the second drive recesses 34b has a depth capable of accommodating the entire roller member 33. As shown in FIG. 5, the depth of the second drive recess 34b is equal to or more than a diameter D1 of the roller member 33. In other words, each of the second drive recesses 34b can accommodate the roller member 33 in such a manner as to prevent from protruding to an outer side in a radial direction from the outer circumferential surface of the second drive rotor 34. A position in a radial direction of the bottom portion of the second drive recess 34b is equal to the center of the V shape of the first drive surface 31a.

The second drive recess 34b is defined by a pair of second drive inclined surface 34c corresponding to a pair of side surfaces positioned in both sides of the second drive recess 34b. Each of the second drive inclined surfaces 34c serves as a second clamping surface. A pair of second drive inclined surfaces 34c are symmetrical with each other with respect to a radial line extending in a radial direction from the rotation center O. Each of the second drive recesses 34b accommodates the roller member 33.

Figure 6:
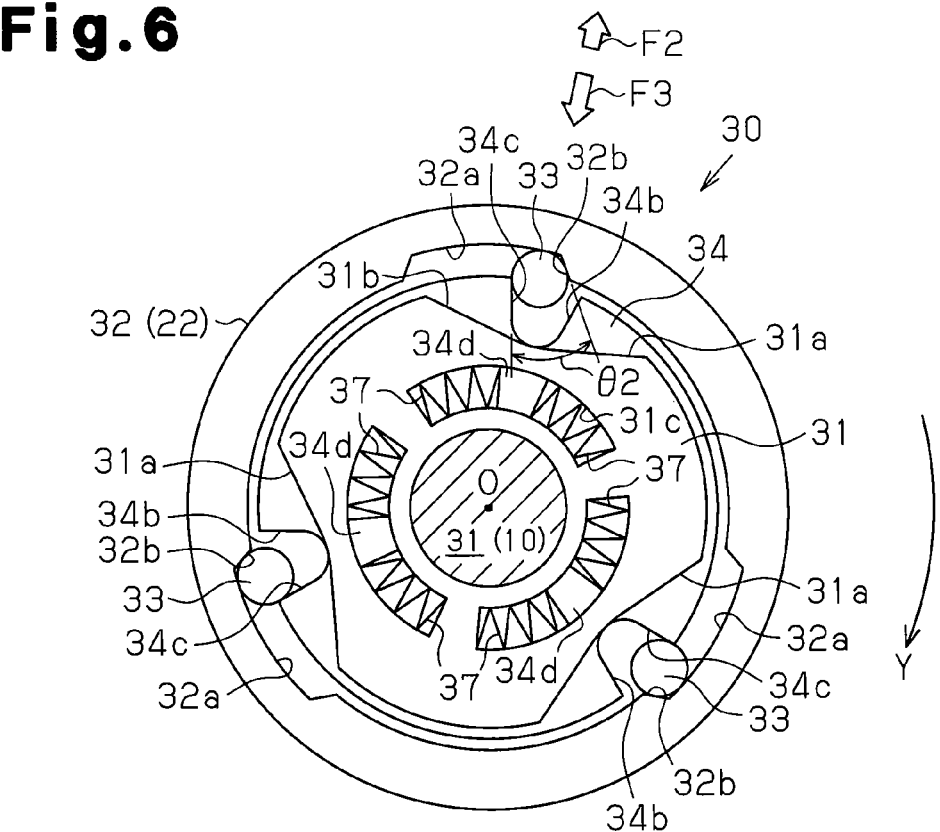
FIGS. 6 and 7 are plan views explaining an operation of the clutch shown in FIG. 5.
Figure 7:
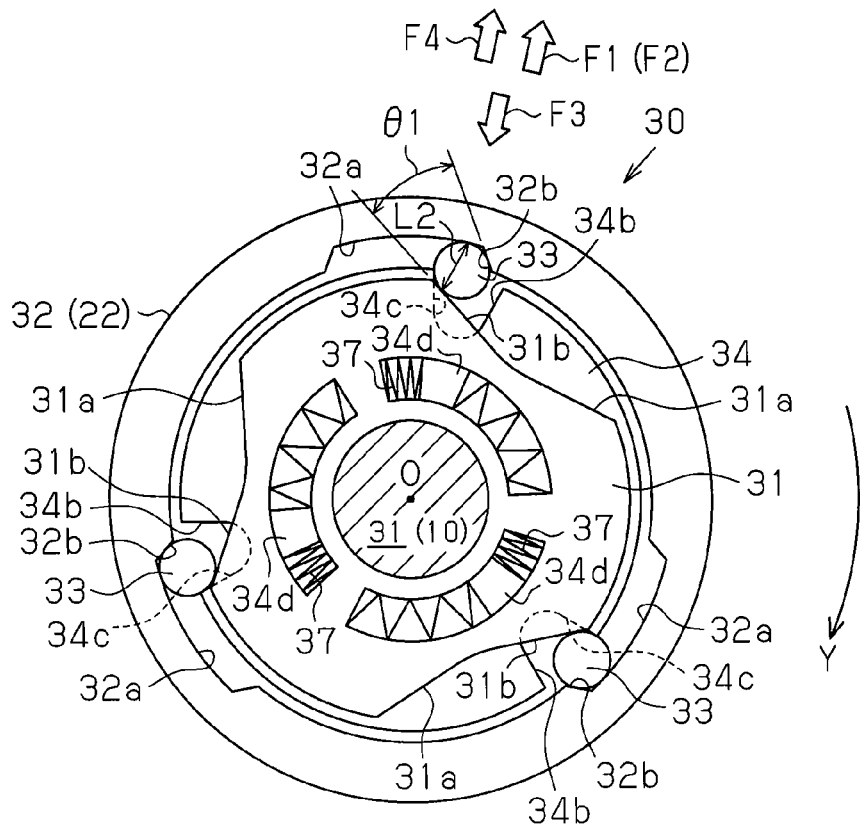

Each of the roller members 33 is movable in a radial direction in the second drive recess 34b. The roller member 33 can move between an engaging position which can be engaged with the driven inclined surface 32b, and a non-engaging position which is not engaged with the driven inclined surface 32b. FIGS. 4, 6 and 7 show the roller member 33 located at the engaging position. FIG. 5 shows the roller member 33 located at the non-engaging position. The non-engaging position is positioned in an inner side in the radial direction than the engaging position. In a state in which the whole of the roller member 33 is accommodated in the second drive recess 34b, the roller member 33 is positioned at the non-engaging position, and is not positioned within the driven recess 32a. A part of the roller member 33 at the engaging position is positioned within the driven recess 32a.

The second drive rotor 34 has three square pole shaped insertion projections 34d extending in an axial direction, at a uniform interval in a circumferential direction. Each of the insertion projections 34d is inserted to the guide groove 31c. When each of the insertion projections 34d is positioned at the center in the circumferential direction of the corresponding guide groove 31c, each of the second drive recesses 34b is positioned at the center of the V shape of the corresponding first drive surface 31a. Each of the guide grooves 31c accommodates a pair of coil springs 37 serving as an urging member in both sides of the insertion projection 34d. A pair of coil springs 37 applies an elastic force acting to hold the insertion projection 34d at the center in the circumferential direction of the guide groove 31c to the insertion projection 34d. The state in which the insertion projection 34d is positioned at the center in the circumferential direction of the guide groove 31c is referred to as "the second drive rotor 34 exists at a predetermined relative rotational position with respect to the driven cylinder 32". In other words, a pair of coil springs 37 in each of the guide grooves 31c acts to hold the second drive rotor 34 at the predetermined relative rotational position with respect to the driven cylinder 32.

As shown in FIG. 5, a first interval L1 corresponding to an interval between the center of the V shape of the first drive surface 31a and a bottom portion of the driven recess 32a is larger than a diameter D1 of the roller member 33. As shown in FIG. 7, a second interval L2 corresponding to an interval between an end portion of the first drive surface 31a and the bottom portion of the driven recess 32a is smaller than the diameter D1. FIG. 7 rhetorically shows the second interval L2 so as to be easily viewed.

As shown in FIG. 5, when the roller member 33 is positioned at the center of the V shape of the first drive surface 31a, a gap is generated between the roller member 33 and the first drive inclined surface 31b. In other words, the first drive rotor 31 and the driven cylinder 32 do not clamp the roller member 33. As a result, the first drive rotor 31 is not engaged with the driven cylinder 32 with respect to the rotating direction. Accordingly, the rotary shaft 10 is in a shut-off state from the worm shaft 22.

As shown in FIG. 7, when the roller member 33 is positioned at the end of the first drive surface 31a, the first drive inclined surface 31b and the driven inclined surface 32b clamp the roller member 33. As a result, the first drive rotor 31 is engaged with the driven cylinder 32 with respect to the rotating direction. Accordingly, the rotary shaft 10 is in a coupled state to the worm shaft 22.

As shown in FIG. 7, when the first drive inclined surface 31b and the driven inclined surface 32b clamp the roller member 33, a first angle θ1 formed by the first drive inclined surface 31b and the driven inclined surface 32b is spread to an outer side in the radial direction in the first clutch 30. In FIG. 7, a clockwise direction is set to a relative rotating direction Y of the first drive rotor 31 with respect to the driven cylinder 32. If the first drive rotor 31 is rotated in the rotating direction Y, the first drive inclined surface 31b applies a first outer urging force F1 directed toward an outer side in the radial direction of the first clutch 30 to the roller member 33. The first outer urging force F1 is a pressing force for urging the roller member 33 toward the driven recess 32a.

FIG. 6 shows a rotational position of the first drive rotor 31 in a step prior to the step of FIG. 7. In other words, in a step prior to a step by which the first drive inclined surface 31b and the driven inclined surface 32b clamp the roller member 33, there is a case that the second drive inclined surface 34c and the driven inclined surface 32b clamp the roller member 33. In this case, a second angle θ2 formed by the second drive inclined surface 34c and the driven inclined surface 32b is spread to an inner side in a radial direction in the first clutch 30. In this case, if the second drive rotor 34 is relatively rotated in the rotating direction Y with respect to the driven cylinder 32, the driven inclined surface 32b applies an inner urging force F3 directed toward the inner side in the radial direction to the roller member 33. The inner urging force F3 corresponds to a pressing force for urging the roller member 33 toward the second drive recess 34b. The second drive inclined surface 34c urges a second outer urging force F2 directed toward an outer side in the radial direction to the roller member 33. The second outer urging force F2 corresponds to a pressing force for urging the roller member 33 facing the driven recess 32a.

As shown in FIG. 5, at a time when the motor main body 2 is not driven, that is, when a rotational driving force is not generated in the rotary shaft 10, the second drive recess 34b is positioned at the center of the V shape of the first drive surface 31a, on the basis of an elastic force of the coil spring 37.

A description will be given below of an operation of the first clutch 30.

When the slide door 52 is opened and closed in accordance with a manual operation, the output shaft 23a is rotated by moving the slide door 52, and the worm shaft 22 is rotated. As shown in FIG. 5, when the roller member 33 exists at the non-engaging position, the driven cylinder 32 is not engaged with the first drive rotor 31 and the second drive rotor 34 with respect to the rotating direction. As shown in FIG. 6, even if the driven inclined surface 32b and the second drive inclined surface 34c clamp the roller member 33, the inner urging force F3 presses the roller member 33 toward the non-engaging position. Accordingly, the roller member 33 enters the second drive recess 34b.

Accordingly, the driven cylinder 32 is shut off from the first drive rotor 31 and the second drive rotor 34. In other words, the rotary shaft 10, which may form a rotary load with respect to the output shaft 23a, is disconnected from the worm shaft 22. Accordingly, the driven cylinder 32 runs idle with respect to the first drive rotor 31 and the second drive rotor 34. In other words, the worm shaft 22 is easily rotated in a state of being shut off from the rotary shaft 10. Therefore, any large manual operating force is not required in the slide door 52, and it is easy to manually operate the slide door 52.

If a command of automatically opening and closing the slide door 52 in accordance with an electric motor control is input to a motor drive circuit (not shown) from the controller, the motor drive circuit drives the motor main body 2, so that the rotary shaft 10 is rotated. If the first drive rotor 31 is rotated together with the rotary shaft 10, the second drive rotor 34 is rotated, and each of the roller members 33 revolves around the rotation center O. The second drive inclined surface 34c causes the roller member 33 to revolve. The roller member 33 is moved to an outer side in the radial direction by receiving a centrifugal force F4 caused by the revolution, and a second outer urging force F2 from the second drive inclined surface 34c, and enters the driven recess 32a as shown in FIG. 6.

When a total of the centrifugal force F4 and the second outer urging force F2 is smaller than the inner urging force F3, the roller member 33 again enters the second drive recess 34b on the basis of the inner urging force F3. As a result, only the first drive rotor 31 and the second drive rotor 34 rotate, and the driven cylinder 32 and the worm shaft 22 remain stopped. The driven inclined surface 32b and the second drive inclined surface 34c clamp the roller member 33.

When the total of the centrifugal force F4 and the second outer urging force F2 is equal to or more than the inner urging force F3, a state is maintained in which the driven inclined surface 32b and the second drive inclined surface 34c clamp the roller member 33 as shown in FIG. 6.

If the first drive rotor 31 is further rotated in the rotating direction Y in a state in which the driven inclined surface 32b and the second drive inclined surface 34c clamp the roller member 33 as shown in FIG. 6, the first drive rotor 31 is relatively rotated in the rotating direction Y with respect to the second drive rotor 34 against the elastic force of the coil spring 37. In other words, the second drive rotor 34 is relatively rotated toward an opposite direction to the rotating direction Y with respect to the first drive rotor 31 against the urging force of the coil spring 37, by receiving the reaction force from the driven cylinder 32 via the roller member 33. As a result, as shown in FIG. 7, the first drive inclined surface 31b is brought into contact with the roller member 33. In other words, the first drive inclined surface 31b and the driven inclined surface 32b clamp the roller member 33. Since the centrifugal force F4 and the first outer urging force F1 press the roller member 33 to an outer side in the radial direction, the roller member 33 is urged toward the driven recess 32a. Accordingly, it is possible to maintain the state in which the first drive inclined surface 31b and the driven inclined surface 32b clamp the roller member 33.

As a result, the first drive rotor 31 is engaged with the driven cylinder 32 with respect to the rotating direction, and the rotary shaft 10 is coupled to the worm shaft 22. In other words, the rotating force caused by driving the motor main body 2 is transmitted to the worm shaft 22, the output shaft 23a is rotated, and the slide door 52 is electrically operated. The slide door 52 is opened or closed in correspondence to a normal rotation or a reverse rotation of the motor main body 2.

When the drive of the motor main body 2 is eventually stopped, the rotation of the rotary shaft 10 is stopped. Accordingly, the first drive rotor 31 is relatively rotated in the opposite direction to the rotating direction Y with respect to the second drive rotor 34 on the basis of the elastic force of the coil spring 37. As a result, as shown in FIG. 6, the insertion projection 34d is returned to the center in the circumferential direction of the guide groove 31c. The second drive recess 34b is returned to the center of the V shape of the first drive surface 31a. The roller member 33 is moved away from the first drive inclined surface 31b. Accordingly, the first drive rotor 31 is shut off from the driven cylinder 32. As a result, the rotary shaft 10 is shut off from the worm shaft 22. In other words, there is achieved a state in which the manual operation of the slide door 52 can be executed.

In the present embodiment, a distance at which the lead of the worm portion 22a, that is, the worm shaft 22 moves in the axial direction at a time when the worm shaft is rotated at one time is previously set to an optimum value in accordance with an experiment, a simulation or the like. As a result, the slide door 52 is smoothly operated in both of the electric motor control and the manual operation. In other words, the lead of the worm portion 22a is set such that both of the driving force transmission from the worm shaft 22 to the worm wheel 23 at a time of the electric motor control of the slide door 52 and the driving force transmission from the worm wheel 23 to the worm shaft 22 at a time of the manual operation of the slide door 52 are optimum.

The first embodiment has the following advantages.

(1) When the motor main body 2 is in the non-drive state, the coil spring 37 arranges the second drive recess 34b at the center of the V shape of the first drive surface 31a. The roller member 33 is positioned within the second drive recess 34b. Accordingly, both of the first drive rotor 31 and the second drive rotor 34 are not engaged with the driven cylinder 32 with respect to the rotating direction. In other words, the rotary shaft 10 is shut off from the worm shaft 22. Accordingly, in the case of manually operating the slide door 52, it is not necessary to rotate the motor main body 2 which may form the operating load. The slide door 52 can be easily operated manually.

When the motor main body 2 is in the drive state, the rotating force of the first drive rotor 31 is transmitted to the second drive rotor 34 via the coil spring 37. As a result, the second drive rotor 34 is rotated, and the roller member 33 revolves. If the centrifugal force F4 and the second outer urging force F2 become equal to or more than the inner urging force F3, the roller member 33 is moved outward in the radial direction, and is engaged with the driven inclined surface 32b. As a result, the first drive rotor 31 is relatively rotated with respect to the second drive rotor 34, and the first drive inclined surface 31b and the driven inclined surface 32b clamp the roller member 33. In other words, the first drive rotor 31 is engaged with the driven cylinder 32 in the rotating direction. As mentioned above, since the roller member 33 is moved to the driven recess 32a from the second drive recess 34b when the motor main body 2 is in the drive state, the first drive rotor 31 is securely engaged with the driven cylinder 32 with respect to the rotating direction. Accordingly, the rotary shaft 10 is coupled to the worm shaft 22. As a result, the driving force output from the motor main body 2 is reliably transmitted to the worm shaft 22.

If the drive of the motor main body 2 is stopped, the second drive recess 34b is returned to the center of the V shape of the first drive surface 31a on the basis of the urging force of the coil spring 37. The roller member 33 is returned within the second drive recess 34b. Accordingly, both of the first drive rotor 31 and the second drive rotor 34 become in the non-engaged state with the driven cylinder 32 with respect to the rotating direction, and the rotary shaft 10 is shut off from the worm shaft 22.

As mentioned above, the first clutch 30 reliably executes the coupling operation and the shut-off operation of the rotary shaft 10 and the worm shaft 22, and is stably operated. As a result, it is possible to improve a reliability of the motor device 1 and the door opening and closing apparatus 50.

(2) The first clutch 30 is arranged between the rotary shaft 10 and the worm shaft 22. In other words, the first clutch 30 is arranged at a position where a torque is comparatively small in the motor device 1. Accordingly, it is possible to make a rigidity of each of the first drive rotor 31, the driven cylinder 32, the roller member 33 and the second drive rotor 34 corresponding to the parts of the first clutch 30 comparatively lower so as to make compact and light in weight. Accordingly, it is possible to make the first clutch 30 compact and light in weight and it is possible to make the motor device 1 compact and light in weight.

The first clutch 30 is of a mechanical type. Accordingly, it is possible to prevent an increase of an electric power consumption of the motor device 1. Further, the first clutch 30 does not require any electric wiring. Accordingly, it is possible to suppress a wiring space in the motor device 1, and it is possible to downsize the motor device 1. In a vehicle mounting apparatus such as the door opening and closing apparatus 50, it is always necessary to downsize a mounting space to the vehicle. Accordingly, a great significance is obtained by downsizing the first clutch 30 and the motor device 1 assembled in the door opening and closing apparatus 50.

(3) As shown in FIG. 7, a first angle $\theta 1$ formed by the first drive inclined surface 31*b* and the driven inclined surface 32*b* is spread toward the outer side in the radial direction of the first clutch 30, that is, toward the driven recess 32*a*. At a time of driving the motor main body 2, in the state in which the first drive inclined surface 31*b* and the driven inclined surface 32*b* clamp the roller member 33, the roller member 33 receives the first outer urging force from the first drive inclined surface 31*b*, and stays in the driven recess 32*a*. Accordingly, it is possible to maintain the engaged state between the first drive rotor 31 and the driven cylinder 32.

As shown in FIG. 6, a second angle $\theta 2$ formed by the second drive inclined surface 34*c* and the driven inclined surface 32*b* is spread toward the inner side in the radial direction of the first clutch 30, that is, toward the second drive recess 34*b*. At a time when the motor main body 2 is not driven, even if the driven cylinder 32 is relatively rotated with respect to the second drive rotor 34, whereby the second drive inclined surface 34*c* and the driven inclined surface 32*b* clamp the roller member 33, the roller member 33 receives the inner urging force F3 from the driven inclined surface 32*b*, and enters the second drive recess 34*b*. Accordingly, it is possible to maintain the non-engaged state between the second drive rotor 34 and the driven cylinder 32. The first clutch 30 is further stably operated.

(4) The first drive rotor 31 has an arcuate guide groove 31*c* extending in the circumferential direction. The second drive rotor 34 has an insertion projection 34*d* extending in the axial direction. Since the insertion projection 34*d* is inserted to the guide groove 31*c*, the first drive rotor 31 is smoothly rotated relatively with respect to the second drive rotor 34. The first clutch 30 is further stably operated.

The coil spring 37 for arranging the second drive recess 34*b* at the center of the V shape of the first drive surface 31*a* is accommodated in the guide groove 31*c*. Accordingly, it is not necessary to independently set the space for accommodating the coil spring 37, and it is easy to downsize the first clutch 30.

(5) The first drive rotor 31 has the first drive surface 31*a* defining the V-shaped recess. The second drive rotor 34 has the second drive recess 34*b*. The driven cylinder 32 has the driven recess 32*a*. The roller member 33 is accommodated in the recesses (31*a*, 34*b*, and 32*a*). Accordingly, it is possible to limit an unexpected movement of the roller member 33, and the first clutch 30 is stably operated. It is not necessary to independently set any member for guiding the movement of the roller member 33.

(6) Each of the roller members 33 is formed in a columnar shape. Accordingly, the roller member 33 can be smoothly moved without unnecessarily being caught on the first drive rotor 31, the second drive rotor 34 and the driven cylinder 32.

Further, a plurality of roller members 33 are arranged at a uniform interval in the circumferential direction in the first clutch 30. Accordingly, it is possible to arrange the engaging portion between the first drive rotor 31 and the driven cylinder 32 with a good balance in the circumferential direction. As a result, the first clutch 30 is further stably operated.

(7) The first clutch 30 couples the rotary shaft 10 to the worm shaft 22 regardless of a forward rotation or a backward rotation of the rotary shaft 10. The first clutch 30 shuts off the worm shaft 22 from the rotary shaft 10 regardless of a forward rotation or a backward rotation of the worm shaft 22. The first clutch 30 is easily applied to the motor device 1 which can be rotated forward and backward.

A description will be given below of a second embodiment of the present invention with reference to FIGS. 9 to 17B.

Figure 9:
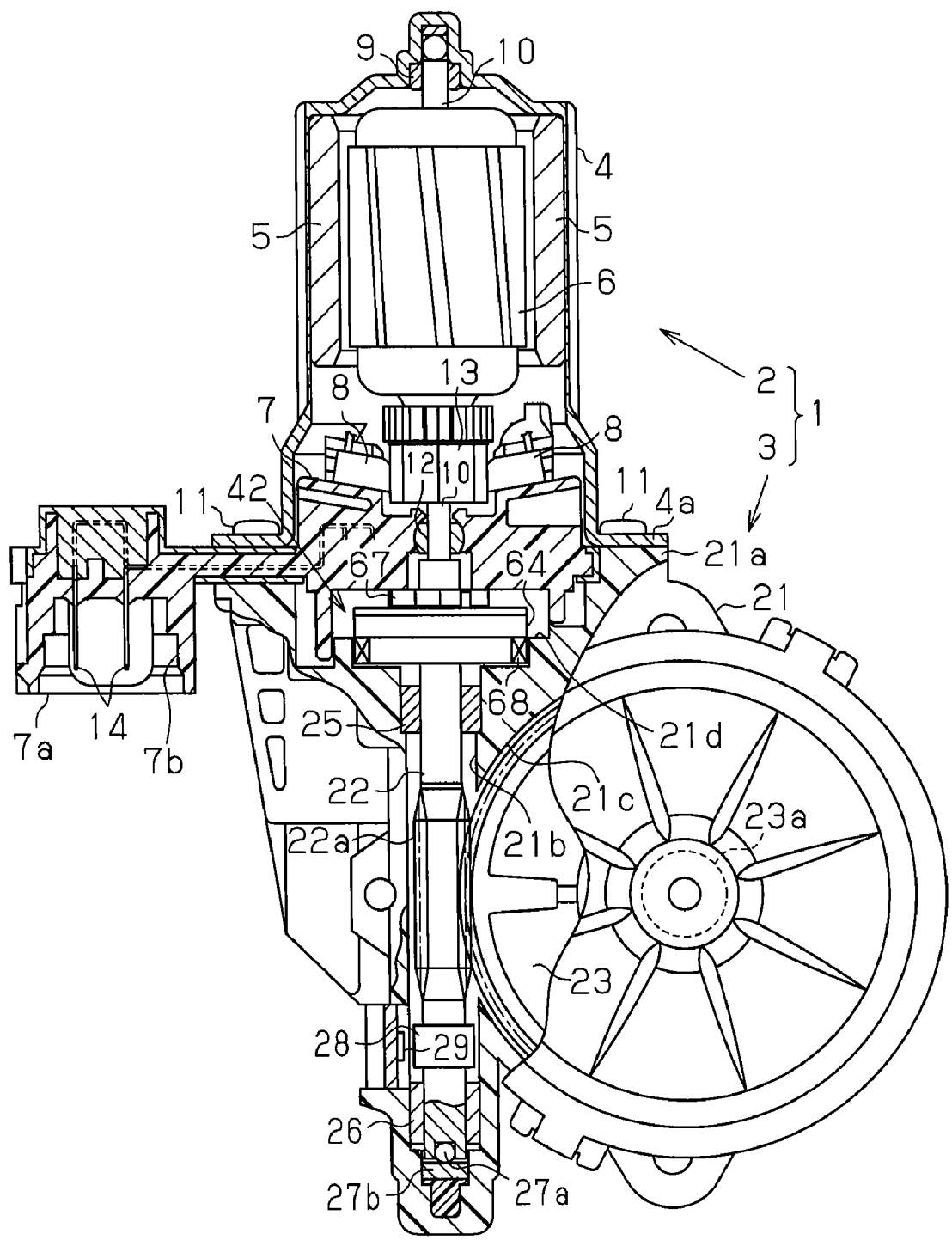
FIG. 9 is a vertical cross-sectional view of a motor device including a second clutch in accordance with a second embodiment of the present invention.
Figure 10:
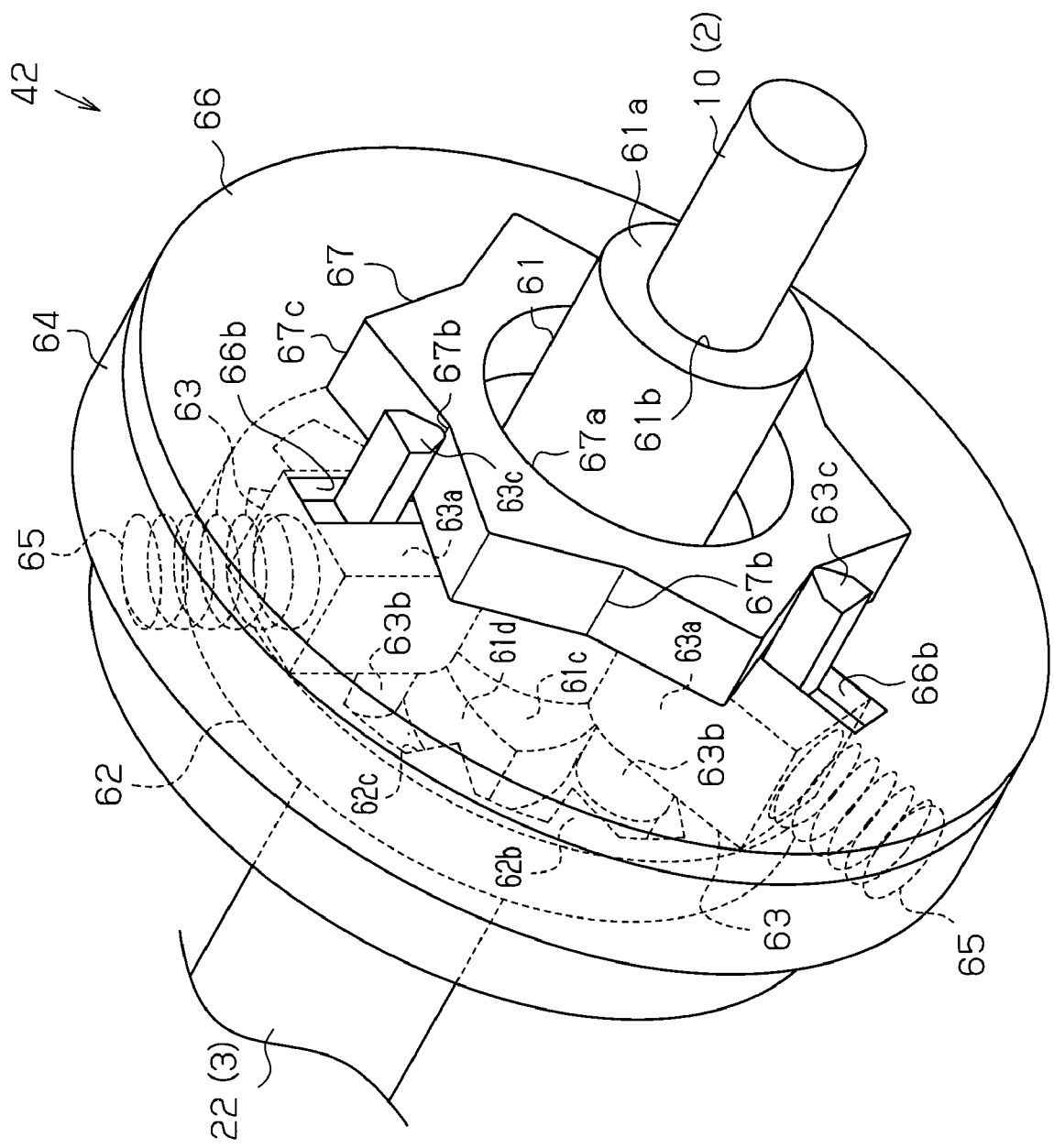
FIG. 10 is a perspective view of the second clutch shown in FIG. 9.

As shown in FIGS. 10 and 11, a second clutch 42 is provided with a drive rotor 61 serving as an input rotor attached to the rotary shaft 10, a driven rotor 62 serving as an output rotor attached to the worm shaft 22, and three contact members 63. Each of the contact members 63 serving as a coupling member is arranged between the drive rotor 61 and the driven rotor 62. Further, the second clutch 42 is further provided with a fixed gear 67 fixed to the brush holder 7 by a screw (not shown), and a support plate 64 which is rotatable with respect to the fixed gear 67. As shown in FIG. 9, the support plate 64 is rotatably supported to the gear housing 21 via a fifth bearing 68. The support plate 64 and a lid body 66 bonded to the support plate 64 accommodate each of the contact members 63. The drive rotor 61 will be referred to as a first rotor, and the driven rotor 62 will be referred to as a second rotor.

As shown in FIG. 11, the drive rotor 61, for example, made of a resin, has a mounting cylinder 61*a*, and a drive disc 61*c* provided in a first end of the mounting cylinder 61*a*. The drive disc 61*c* is expanded vertically with respect to the mounting cylinder 61*a* corresponding to a shaft portion. The drive disc 61*c* is coaxial with the mounting cylinder 61*a*. A second end of the mounting cylinder 61*a* has a mounting hole 61*b*. A distal end of the rotary shaft 10 is fitted and inserted to the mounting hole 61*b*. In other words, a cross-sectional shape of the mounting hole 61*b* is the same as a cross-sectional shape of the rotary shaft 10. A cross-sectional shape of a distal end of the rotary shaft 10 can be formed, for example, in a D-shaped form. The cross-sectional shape of the distal end of the rotary shaft 10 may be formed in a shape obtained by cutting a circle by two parallel lines, that is, a width across flat shape. The rotary shaft 10 is fitted and inserted to the mounting hole 61*b*, whereby the drive rotor 61 is coupled to the rotary shaft 10 so as to be integrally rotatable.

The drive disc 61*c* is formed in a triangular shape as a whole. The drive disc 61*c* has three drive protrusions 61*d* serving as a drive engaging portion individually formed in a triangular shape at a uniform interval (at an interval of 120 degrees) in a circumferential direction. An outer surface in a radial direction of each of the drive protrusions 61*d* is formed in a curved shape which is somewhat bulged to an outer side in the radial direction. In other words, the adjacent drive protrusions 61*d* define a drive recess 61*e* which is recessed to an inner side in the radial direction. The total three drive recesses 61*e* are positioned at a uniform interval (at an interval of 120 degrees) in the circumferential direction.

The driven rotor 62 is integrally formed in an end portion of the worm shaft 22 so as to be coaxial with the worm shaft 22. The driven rotor 62 may be formed as an independent member from the worm shaft 22, and may be coupled to the worm shaft 22. Both of the driven rotor 62 and the worm shaft 22 are made, for example, of a metal.

The driven rotor 62 has an accommodating recess 62a accommodating the drive disc 61c. The driven rotor 62 has a driven outer ring 62b defining the accommodating recess 62a. The driven outer ring 62b is formed coaxial with the worm shaft 22, that is, coaxial with the drive disc 61c. Twelve driven recesses 62c are formed on an inner circumferential surface of the driven outer ring 62b at a uniform interval. Each of the driven recesses 62c serving as a coupling recess is open toward an inner side in the radial direction, that is, toward the drive rotor 61. Each of the driven recesses 62c is formed in a trapezoidal shape which is spread toward an inner side in the radial direction. In a state in which the drive disc 61c is positioned at the accommodating recess 62a, the driven outer ring 62b and the drive disc 61c face to each other in the radial direction.

As shown in FIGS. 10 and 11, the contact member 63, for example, made of a resin, has a rectangular parallelepiped contact main body 63a, a first contact protrusion 63b extending in an axial direction from the contact main body 63a, and a second contact protrusion 63c extending to an opposite side to the first contact protrusion 63b from the contact main body 63a. The first contact protrusion 63b extends toward the worm shaft 22, and the second contact protrusion 63c extends toward the rotary shaft 10. The first contact protrusion 63b is positioned in an inner side in the radial direction than the second contact protrusion 63c. The first contact protrusion 63b serves as a columnar coupling protrusion. The second contact protrusion 63c serves as a pentagon prismatic locking protrusion extending toward the rotary shaft 10. The respective contact members 63 are arranged at a uniform interval (at an interval of 120 degrees) in the circumferential direction with respect to the support plate 64. Each of the contact members 63 is movable in the radial direction with respect to the support plate 64.

Figure 12A:
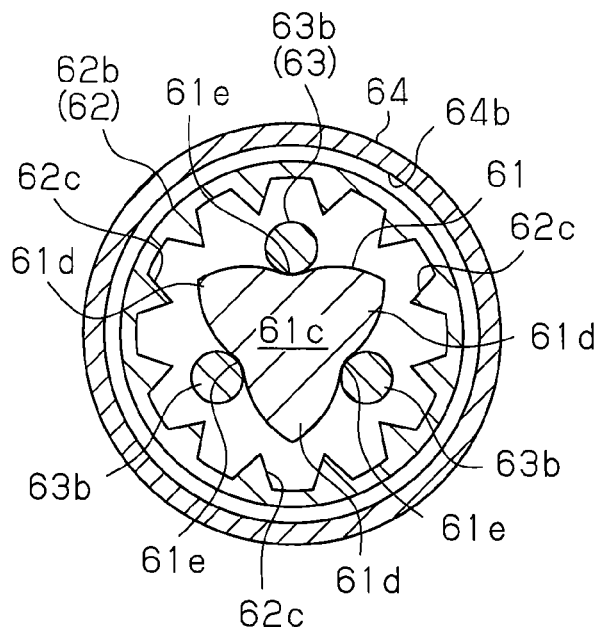
FIG. 12A is a cross-sectional view of the second clutch shown in FIG. 10, and shows the relation among a drive disc, a driven rotor, and a first contact protrusion.

As shown in FIGS. 10 and 11, the support plate 64 serving as a holding member, and a lid body 66 cover the driven rotor 62 and the drive disc 61c. For example, the resin support plate 64 is formed in a step shape, and has a large-diameter disc facing the rotary shaft 10, and a small-diameter cylinder facing the worm shaft 22. A center of the large-diameter disc has an insertion hole 64a having a circular cross section. The mounting cylinder 61a extends through the insertion hole 64a. The small-diameter cylinder defines an accommodating hole 64b having a circular cross section. The accommodating hole 64b communicates with the insertion hole 64a. As shown in FIG. 12A, the accommodating hole 64b accommodates the driven rotor 62.

As shown in FIG. 11, the large-diameter disc of the support plate 64 has three guide grooves 64c at a uniform interval (at an interval of 120 degrees). Each of the guide grooves 64c extends in the radial direction from the insertion hole 64a. Each of the guide groove 64c has a quadrangular cross-sectional shape corresponding to the contact main body 63a. An outer end in the radial direction of each of the guide grooves 64c is closed. Each of the guide grooves 64c serves as an accommodating groove accommodating the contact main body 63a. Each of the guide grooves 64c allows the corresponding contact main body 63a to move in the radial direction, however, inhibits from moving in the circumferential direction. Each of the first contact protrusions 63b is positioned between the driven outer ring 62b, and the drive disc 61c which is in the inner side in the radial direction than the driven outer ring 62b.

Each of the guide grooves 64c accommodates a coil spring 65. The coil spring 65 is positioned between the contact main body 63a, and an outer end in the radial direction of the guide groove 64c. Each of the coil springs 65 serves as an urging member urging the contact main body 63a in the inner side in the radial direction. The discoid lid body 66 closes the guide groove 64c in the state of accommodating the contact member 63 and the coil spring 65 with respect to the axial direction. The lid body 66 is fixed to the support plate 64. The center of the lid body 66 has a circular insertion hole 66a corresponding to the insertion hole 64a. The lid body 66 has three notch grooves 66b extending outward in the radial direction from the insertion hole 66a. Each of the second contact protrusions 63c passes through the corresponding notch groove 66b so as to protrude from the lid body 66. At a time when each of the notch grooves 66b is moved in the radial direction along the guide groove 64c, each of the guide grooves 64c allows the second contact protrusion 63c to move in the radial direction.

As shown in FIG. 10, the fixed gear 67 serving as a regulating and guiding member is a hexagram shaped plate member facing the lid body 66. A distal end of each of the second contact protrusions 63c protruding from the lid body 66 can be locked to an outer circumferential surface of the fixed gear 67 from the radial direction. A corner portion in an inner side in the radial direction of each of the second contact protrusions 63c is locked to the outer circumferential surface of the fixed gear 67. The fixed gear 67 is formed, for example, by a resin. The fixed gear 67 may be integrally formed with the brush holder 7. The center of the fixed gear 67 has a circular insertion hole 67a corresponding to the insertion hole 64a of the support plate 64. An outer peripheral edge of the fixed gear 67 has a fixed recess 67b which is somewhat recessed in a V shape toward the inner side in the radial direction, in an intermediate portion of individual portions corresponding six lines of the hexagon. Each of fixed corner portions 67c in the outer edge portion of the fixed gear 67 somewhat protrudes to an outer side in the radial direction. The outer surface in the radial direction of the fixed gear 67 defining the fixed recess 67b serves as a guide portion guiding the contact member 63.

Figure 12B:
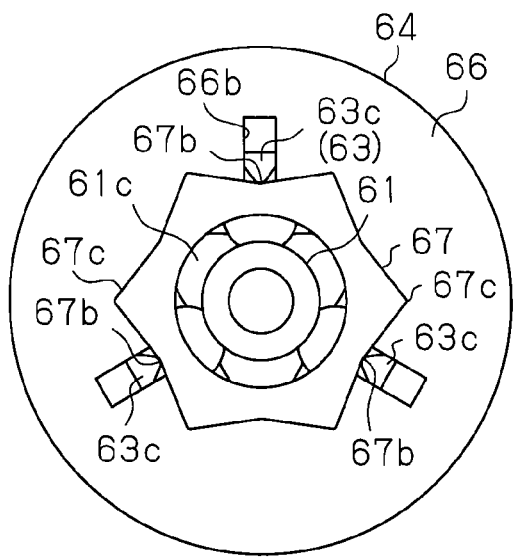
FIG. 12B is a plan view showing the relation between a fixed gear and a second contact protrusion, in the second clutch shown in FIG. 12A.

As shown in FIG. 12A, if each of the first contact protrusions 63b is arranged in an innermost portion of the corresponding drive recess 61e, that is, a center of the drive recess 61e, each of the first contact protrusions 63b is not locked to the driven outer ring 62b. In other words, a state in which the first contact protrusions 63b respectively exist in the centers of the corresponding drive recesses 61e will be referred to as a state in which "the contact member 63 exists at a unlockable position". The contact member 63 located at the unlockable position cannot be locked to the driven rotor 62 with respect to the rotating direction. In this case, the driven rotor 62 is shut off from the drive rotor 61. Each of the coil springs 65 brings the corresponding second contact protrusion 63c into contact with the support plate 64 in the center of the fixed recess 67b as shown in FIG. 12B. In other words, each of the coil springs 65 urges the corresponding contact member 63 toward the unlockable position. As a result, each of the contact members 63 is regulated in the rotation with respect to the fixed gear 67. The support plate 64 locked to the contact member 63 in the circumferential direction is also regulated in the rotation with respect to the fixed gear 67.

Figure 15A:
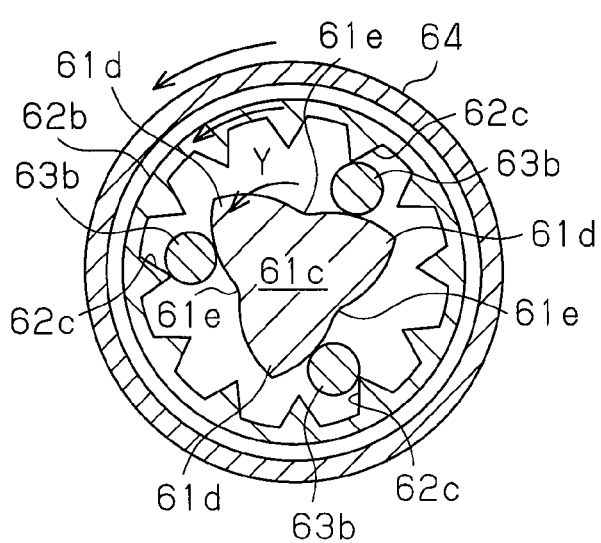
Figure 15B:
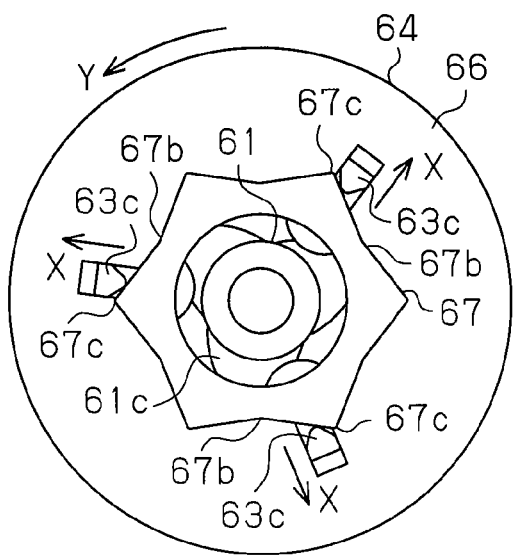
Figure 16A:
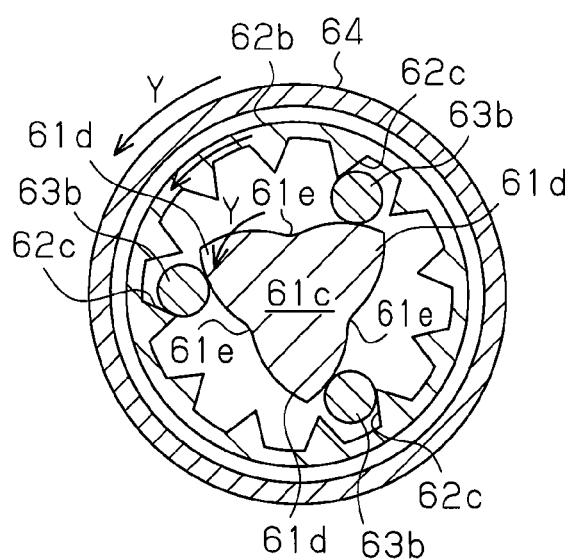
Figure 16B:
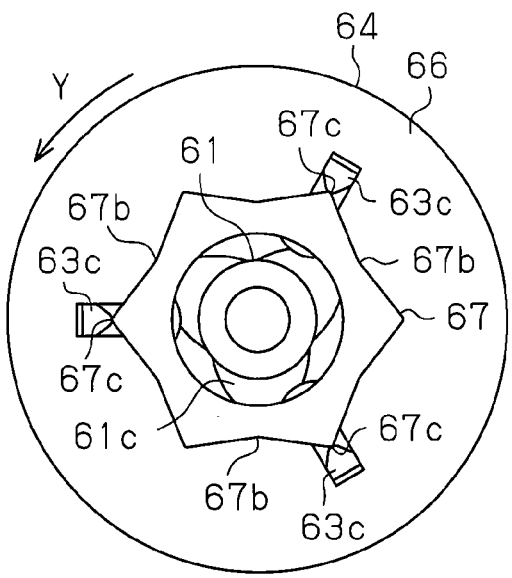
Figure 17A:
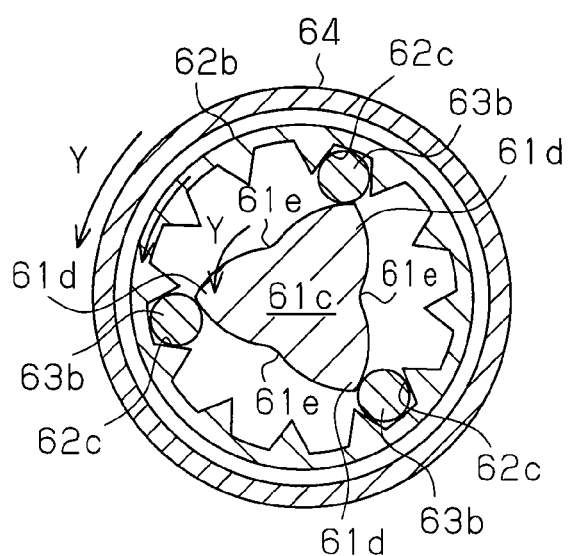
Figure 17B:
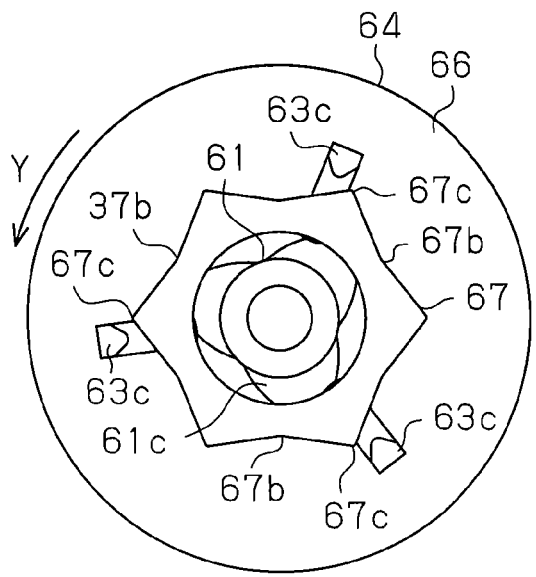

FIGS. 12A to 17B show the case that the rotating direction Y of the drive rotor 61 is a counterclockwise direction. FIGS. 13A and 13B show the second clutch 42 at the same time. FIGS. 14A and 14B show the second clutch 42 at the same time. On the basis of the rotation of the drive rotor 61, each of the first contact protrusions 63b is moved to an outer side in the radial direction along the side surface of each of the drive protrusions 61d, and the first contact protrusion 63b is arranged in the driven recess 62c as shown in FIG. 17A. Accordingly, as shown in FIG. 17B, each of the first contact protrusions 63b is locked to the driven outer ring 62b in the rotating direction against the urging force of the coil spring 65. In this case, the drive rotor 61 is coupled to the driven rotor 62 via each of the contact members 63, that is, the first contact protrusion 63b. In other words, each of the contact members 63 is locked to the driven rotor 62 with respect to the rotating direction, by being positioned at a lockable position located in an outer side in the radial direction than the unlockable position.

The drive rotor 61 in the rotating state urges each of the contact members 63 toward an outer side in the radial direction, that is, toward the lockable position. Since each of the contact members 63 is moved outward in the radial direction, each of the second contact protrusions 63c is moved away from each of the fixed corner portions 67c, and is moved outward in the radial direction. Accordingly, the second contact protrusion 63c comes to the state in which the second contact protrusion 63c cannot be locked to the fixed gear 67. As a result, the rotation suppressing state of the support plate 64 is cancelled, and the support plate 64 is rotated together on the basis of the rotation of the drive rotor 61. Therefore, the driven rotor 62 locked to each of the first contact protrusions 63b in the circumferential direction is rotated.

A dimension of each of the contact member 63, the drive disc 61c and the driven outer ring 62b is set in such a manner that the operation mentioned above is smoothly executed.

When the rotating force is not generated in the rotary shaft 10 such as the time when the motor main body 2 is not driven, each of the first contact protrusions 63b is guided to the center of the corresponding drive recess 61e as shown in FIG. 12A, by the urging of the contact member 63 inward in the radial direction by the coil spring 65. In this case, as shown in FIG. 12B, each of the second contact protrusions 63c is guided to the center of each of the fixed recesses 67b.

When each of the first contact protrusions 63b is not guided to the center of the corresponding drive recess 61e only by the urging force of the coil spring 65, and when the second contact protrusion 63c is not guided to the center of the corresponding fixed recess 67b, each of the first contact protrusions 63b collides with the driven outer ring 62b on the basis of the rotation of the driven outer ring 62b. As a result, each of the first contact protrusions 63b is guided to the center of the corresponding drive recess 61e. In the same manner, each of the second contact protrusions 63c is guided to the center of the corresponding fixed recess 67b on the basis of the collision of the driven outer ring 62b to each of the first contact protrusions 63b.

If each of the first contact protrusions 63b is arranged in the center of each of the drive recesses 61e, each of the first contact protrusions 63b is positioned to the driven outer ring 62b so that it cannot be locked to the driven outer ring 62b. Accordingly, the worm shaft 22 is shut off from the rotary shaft 10, and the rotary shaft 10 is disconnected from the worm shaft 22. As a result, the rotary load of the output shaft 23a is reduced. Accordingly, the rotation of the output shaft 23a is easy, and the slide door 52 can be manually operated.

Since each of the second contact protrusions 63c is positioned at the corresponding fixed recess 67b, each of the contact members 63 is locked to the fixed gear 67 in the circumferential direction. Accordingly, the rotation of the support plate 64 is suppressed. In other words, it is possible to prevent the support plate 64 from being rotated together with the driven rotor 62 at a time of manually operating the slide door 52.

Figure 13A:
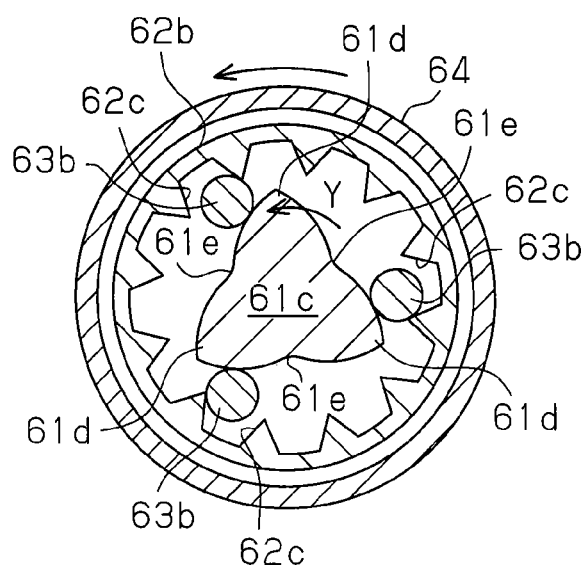

If the motor main body 2 is driven so as to electrically operate the slide door 52, the drive rotor 61 is rotated together with the rotary shaft 10. Accordingly, as shown in FIG. 13A, each of the first contact protrusions 63b is guided by the side surface of the drive protrusions 61d, and is pushed outward in the radial direction. Each of the contact members 63 is moved outward in the radial direction against the urging force of the coil spring 65.

Figure 13B:
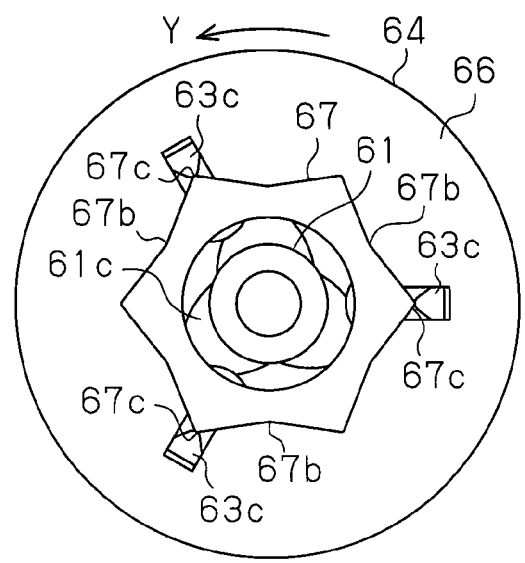

As shown in FIG. 13A, since each of the first contact protrusions 63b receives the rotating force from the drive disc 61c, the support plate 64 is also rotated. Accordingly, as shown in FIG. 13B, each of the second contact protrusions 63c is guided by an inclined surface of the fixed recess 67b, and each of the contact members 63 is smoothly moved outward in the radial direction. The first contact protrusion 63b is moved outward in the radial direction toward the corresponding driven recess 62c.

Figure 14A:
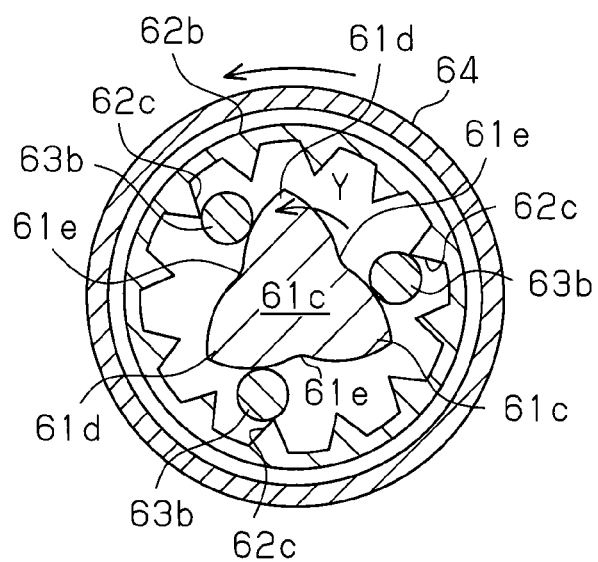
Figure 14B:
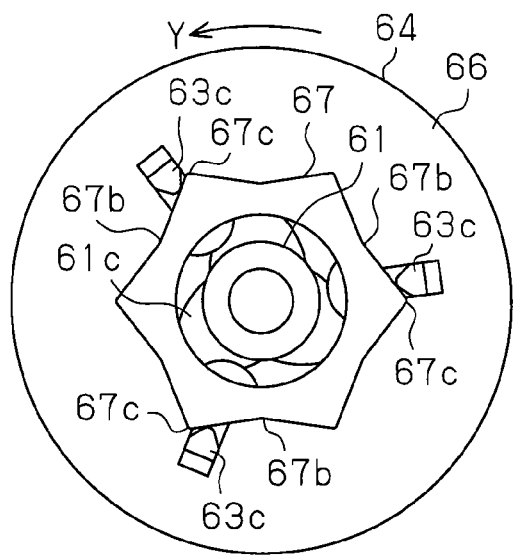

If the drive disc 61c is further rotated, each of the first contact protrusions 63b is engaged with the side surface of the driven recess 62c as shown in FIG. 14A. As shown in FIG. 15A, if the drive rotor 61 is further rotated, each of the first contact protrusions 63b is guided by the side surface of each of the drive protrusions 61d. As shown in FIG. 15B, the second contact protrusion 63c is guided by the inclined surface in the fixed recess 67b, and is moved along arrow X directed toward the outer side in the radial direction. As a result, as shown in FIG. 16A, each of the first contact members 63 further moves to the other side in the radial direction. As shown in FIG. 16, each of the first contact protrusions 63b enters the driven recess 62c.

FIG. 17A shows a state in which each of the first contact protrusions 63b is arranged in an outermost portion of the driven outer ring 62b in such a manner as to be in the engaged state with the driven outer ring 62b with respect to the rotating direction. Accordingly, each of the second contact protrusions 63c comes to the non-engaged state with the outer circumferential surface of the fixed gear 67 as shown in FIG. 17B, while the rotating force of the drive rotor 61 is transmitted to the driven outer ring 62b. As a result, the support plate 64 is smoothly rotated. The operations of FIGS. 13A to 17B are the same when the drive rotor 61 is rotated in the clockwise direction.

As mentioned above, the rotating force of the motor main body 2 is transmitted to the driven outer ring 62b from the drive rotor 61 via each of the first contact protrusions 63b. In other words, if the motor main body 2 rotates the drive rotor 61, each of the contact members 63 is moved outward in the radial direction against the urging force of the coil spring 65. As a result, the drive rotor 61 is coupled to the driven rotor 62 through each of the contact members 63. Accordingly, the worm shaft 22 is rotated, and the slide door 52 is opened and closed.

In the case of manually operating the slide door 52, the rotating force is applied to the worm shaft 22 from the slide door 52 via the wire cable 55. At this time, each of the contact members 63 is positioned in the driven rotor 62 such that it cannot be locked to the driven rotor 62, on the basis of the urging force of the coil spring 65. Accordingly, the rotary shaft 10 is shut off from the worm shaft 22. The rotation of the worm shaft 22 is not transmitted to the rotary shaft 10. The slide door 52 is manually operated easily without requiring any great operating force.

The second embodiment has the following advantages.

(8) If the drive rotor 61 is rotated at a time of driving the motor main body 2, each of the contact members 63 is moved outward in the radial direction against the urging force of the coil spring 65, and is locked to the driven rotor 62. As a result, the drive rotor 61 is coupled to the driven rotor 62 through each of the contact members 63. In other words, the second clutch 42 couples the rotary shaft 10 to the worm shaft 22 so as to be integrally rotatable by driving the motor main body 2. Accordingly, the second clutch 42 enables the electric motor control of the slide door 52.

At a time when the motor main body 2 is not driven, each of the contact members 63 is positioned such that it cannot be locked to the driven rotor 62 on the basis of the urging force of the coil spring 65. Accordingly, the driven rotor 62 is shut off from the drive rotor 61. In other words, the second clutch 42 shuts off the rotary shaft 10 from the worm shaft 22 at a time when the motor main body 2 is not driven. Accordingly, it is possible to reduce the load of the manual operation of the slide door 52.

(9) The fixed gear 67 having a plurality of fixed recesses 67*b* is fixed to the brush holder 7. Each of the fixed recesses 67*b* guides the contact member 63 to the position capable of being locked to the driven rotor 62. In other words, each of the contact members 63 is moved along the fixed recess 67*b* at a time of being moved outward in the radial direction on the basis of the rotating force of the drive rotor 61 so as to be locked to the driven rotor 62. Accordingly, each of the contact members 63 is smoothly moved. The second clutch 42 is further stably operated.

The fixed gear 67 is fixed to the brush holder 7, which is an existing motor part. Accordingly, it is not necessary to be independently provided with the member for fixing the fixed gear 67, and it is possible to limit the number of the parts of the motor device 1 small.

(10) The second clutch 42 has the support plate 64 holding the contact member 63 and the coil spring 65. Accordingly, the second clutch 42 is easily assembled to form a single unit. Further, it is possible to prevent the contact member 63 and the coil spring 65 from affecting the other member or being affected from the other member. The second clutch 42 is further stably operated.

A description will be given of a third embodiment of the present invention with reference to FIGS. 18 to 25B.

Figure 18:
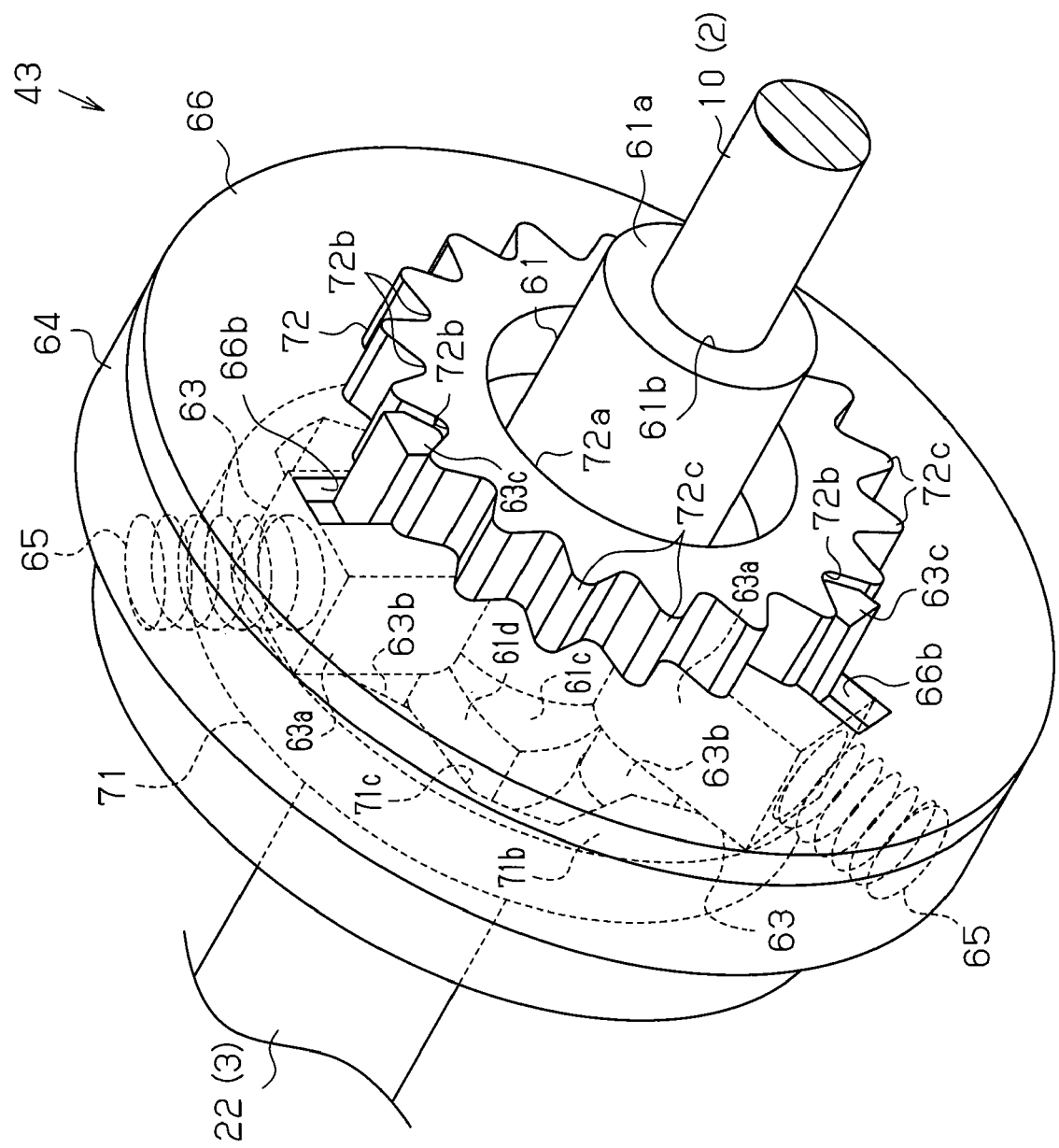
FIG. 18 is a perspective view of a third clutch in accordance with a third embodiment of the present invention.
Figure 19:
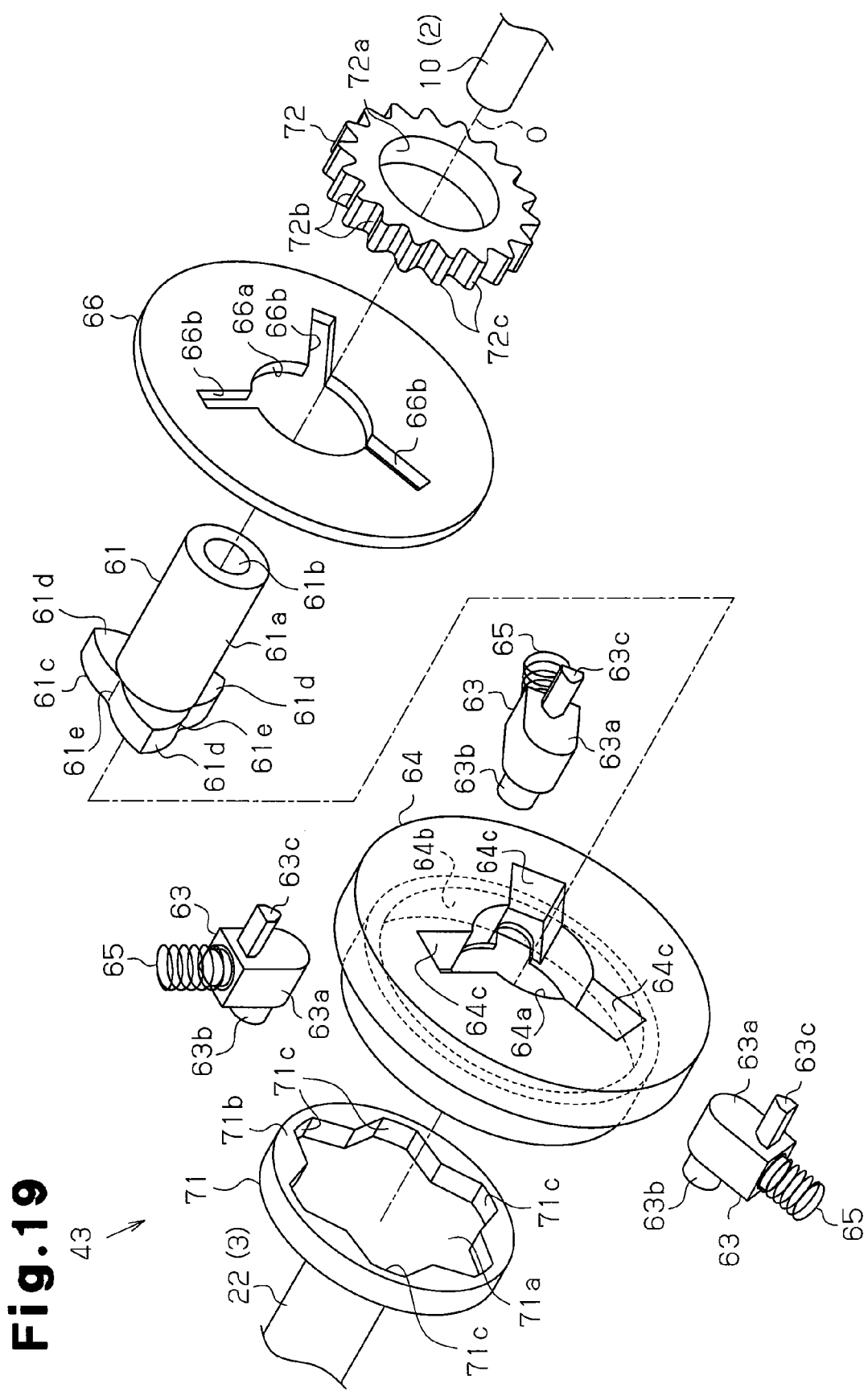
FIG. 19 is an exploded perspective view of the third clutch shown in FIG. 18.

As shown in FIGS. 18 and 19, a third clutch 43 in accordance with the third embodiment is structured such that a driven rotor 71 and a fixed gear 72 are modified in comparison with the second clutch 42 in accordance with the second embodiment. The same reference numerals are attached to the same structure as the second embodiment, and a description thereof will be omitted.

As shown in FIGS. 18 and 19, the driven rotor 71 has six driven recesses 71*c*. In other words, the number of the driven recesses 71*c* in accordance with the third embodiment is half of the twelve driven recesses 62*c* in the driven rotor 62 in accordance with the second embodiment.

An outer circumferential surface of the fixed gear 72 has eighteen fixed recesses 72*b* and eighteen fixed corner portions 72*c* alternately one by one. The outer circumferential surface of the fixed gear 72 is formed in a wavy shape. Each of the numbers of the fixed recesses 72*b* and the fixed corner portions 72*c* in the third embodiment is threefold of the six fixed recess 67*b* and six fixed corner portions 67*c* in the second embodiment. The fixed gear 72 is fixed to the brush holder 7 or integrally formed with the brush holder 7.

Figure 20A:
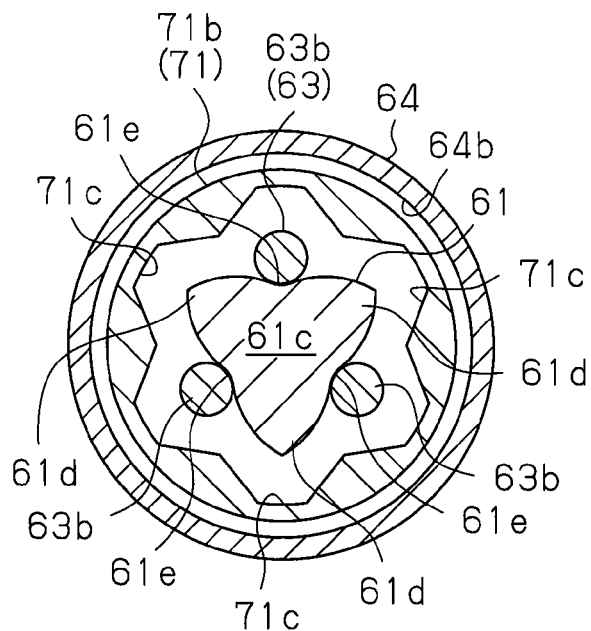
FIG. 20A is a cross-sectional view of the third clutch shown in FIG. 18, and shows a relation among a drive disc, a driven rotor, and a first contact protrusion.
Figure 20B:
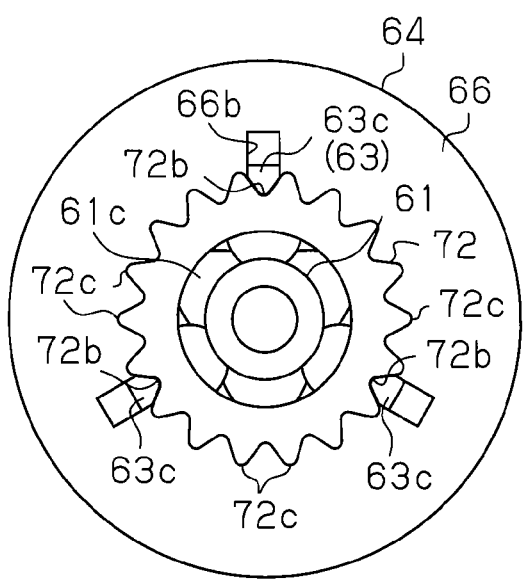
FIG. 20B is a plan view showing the relation between a fixed gear and a second contact protrusion, in the third clutch shown in FIG. 20A.
Figure 21A:
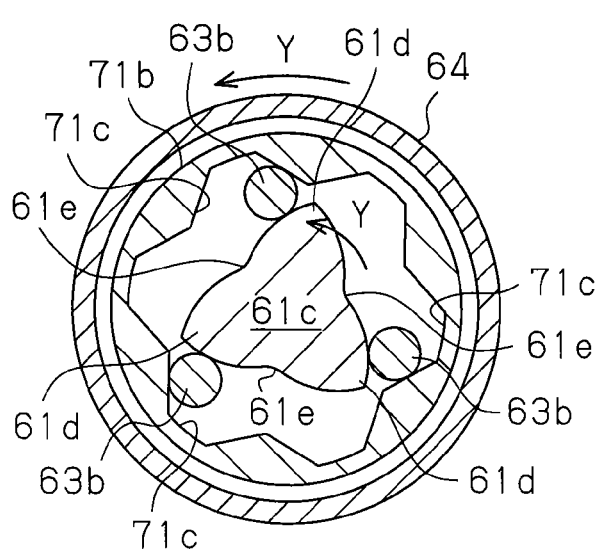
Figure 21B:
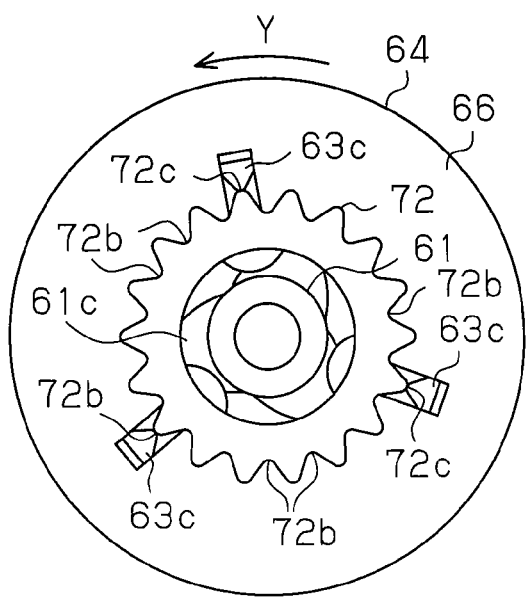
Figure 22A:
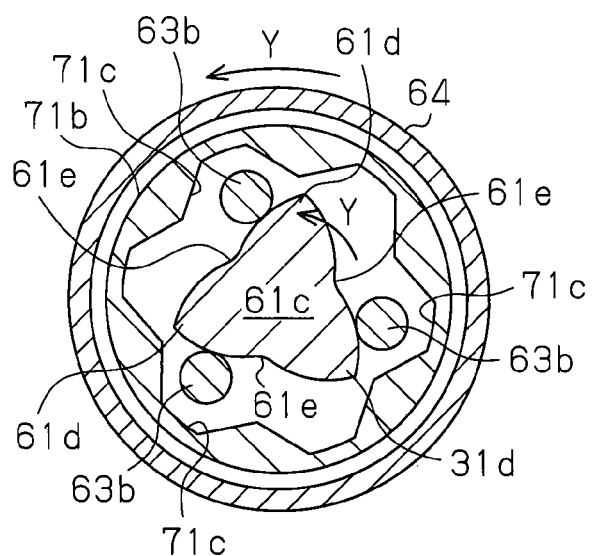
Figure 22B:
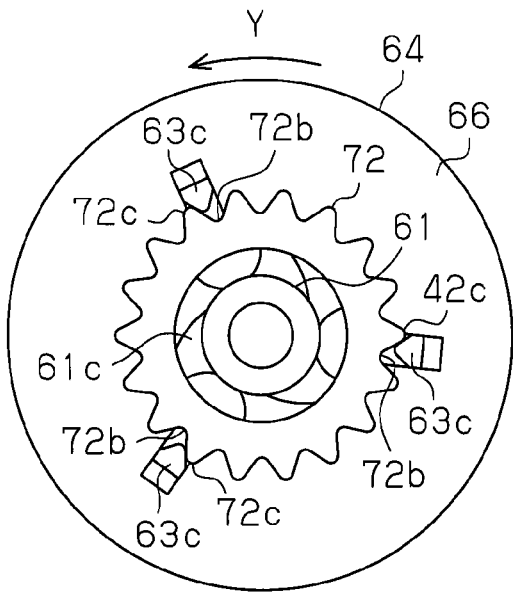
Figure 23A:
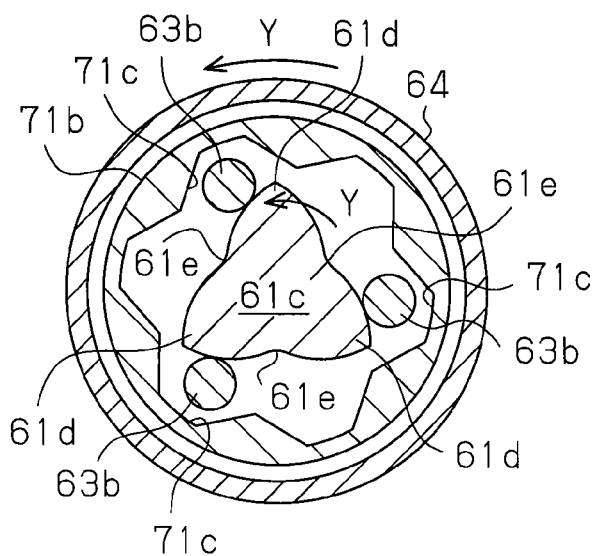
Figure 23B:
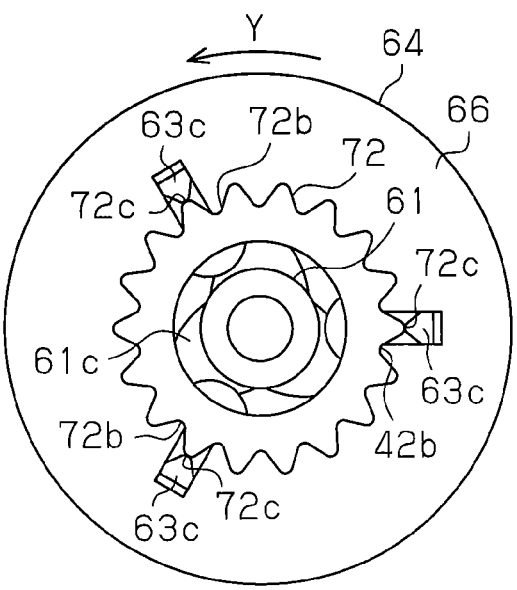
Figure 24A:
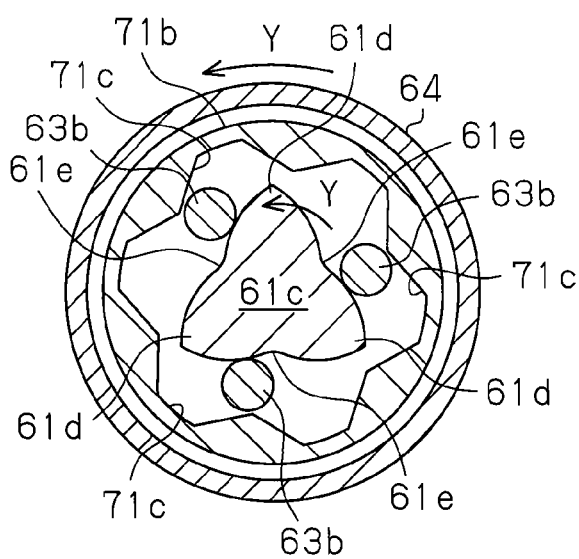
Figure 24B:
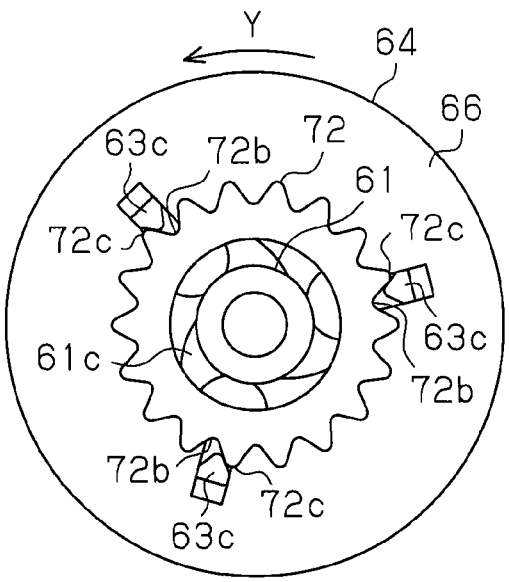

The third clutch 43 is also operated in the same manner as the second clutch 42 mentioned above. In other words, when the rotation driving force is not generated in the rotary shaft 10 such as the time when the motor main body 2 is not driven, each of the first contact protrusions 63*b* is positioned in a driven outer ring 71*b* of the driven rotor 71 such that the first contact protrusions 63*b* cannot be locked to the driven outer ring 71*b* as shown in FIG. 20A on the basis of the urging of the contact member 63 inward in the radial direction by the coil spring 65. As a result, the worm shaft 22 is shut off from the rotary shaft 10, and it is possible to manually operate the slide door 52 easily.

Since each of the second contact protrusions 63*c* is arranged within the fixed recess 72*b* of each of the fixed gears 72, the rotation of the support plate 64 is suppressed, and it is possible to prevent the rotation together with the driven rotor 71 (the driven outer ring 71*b*) which is rotated at a time of manually operating the slide door 52. The fixed gear 72 has a lot of fixed recesses 72*b*. Accordingly, each of the second contact protrusions 63*c* is easily fitted, and the engaging force with respect to the rotating direction is great, in comparison with the second clutch 42.

If the motor main body 2 is driven so as to automatically open and close the slide door 52 and the drive rotor 61 is rotated together with the rotary shaft 10, each of the first contact protrusions 63*b* is pushed outward in the radial direction against the urging force of the coil spring 65 on the basis of the rotation of the drive disc 61*c*, that is, the rotation of each of the drive protrusions 61*d*.

Since each of the first contact protrusions 63*b* receives the rotating force from the drive disc 61*c*, the support plate 64 is rotated in the same direction, and each of the second contact protrusions 63*c* is guided to an inclined surface of the fixed recess 72*b*. As a result, each of the contact members 63 is smoothly moved outward in the radial direction easily. The first contact protrusion 63*b* enters the driven recess 71*c*.

Figure 25A:
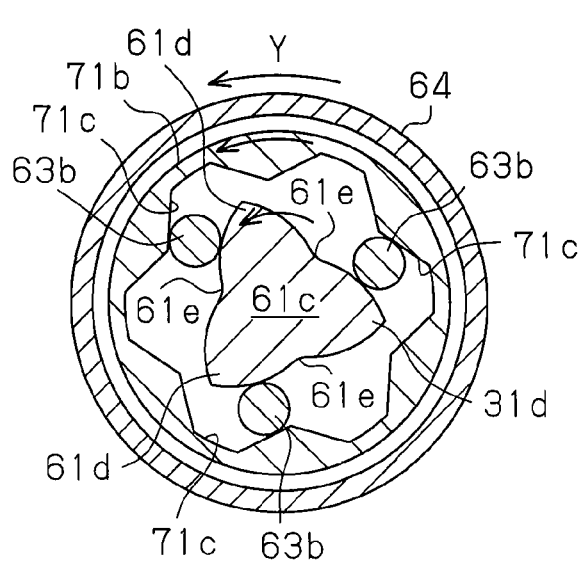
Figure 25B:
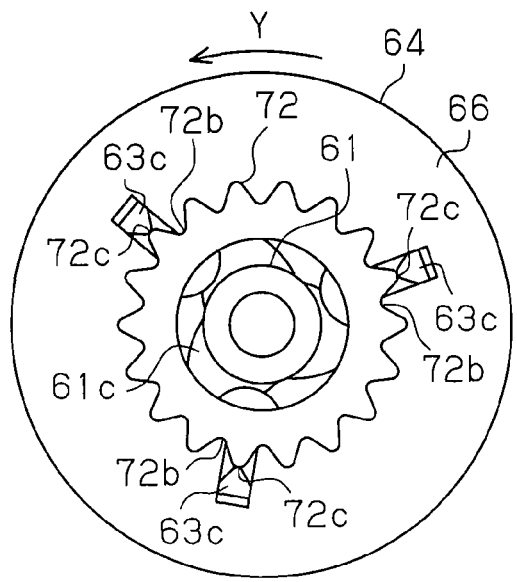

If the drive disc 61*c* is further rotated, the fixed recess 72*b* is set more finely in the circumferential direction than the driven recess 71*c*, as shown in FIGS. 22A to 24B. Accordingly, each of the second contact protrusions 63*c* repeats entering the fixed recess 72*b* and getting over the fixed corner portion 72*c* several times. Each of the first contact protrusions 63*b* is eventually engaged with a side surface of the driven recess 71*c* in the rotating direction, as shown in FIG. 25A.

Each of the first contact protrusions 63*b* is guided to the side surface of each of the drive protrusions 61*d* and is fitted deeply into the driven recess 71*c*, on the basis of the further rotation of the drive rotor 61. As a result, each of the second contact protrusions 63*c* is not engaged with an outer circumferential surface of the fixed gear 72. Accordingly, the rotating force of the drive rotor 61 is transmitted to the driven outer ring 71*b*. As mentioned above, in the present embodiment, the rotating force of the rotary shaft 10 generated by driving the motor main body 2 is transmitted to the worm shaft 22 and the output shaft 23*a*. As a result, the motor device 1 opens and closes the slide door 52.

The third clutch 43 has the same advantages as those of the second clutch 42 mentioned above.

A description will be given of a fourth embodiment of the present invention with reference to FIGS. 26 to 32B.

Figure 27:
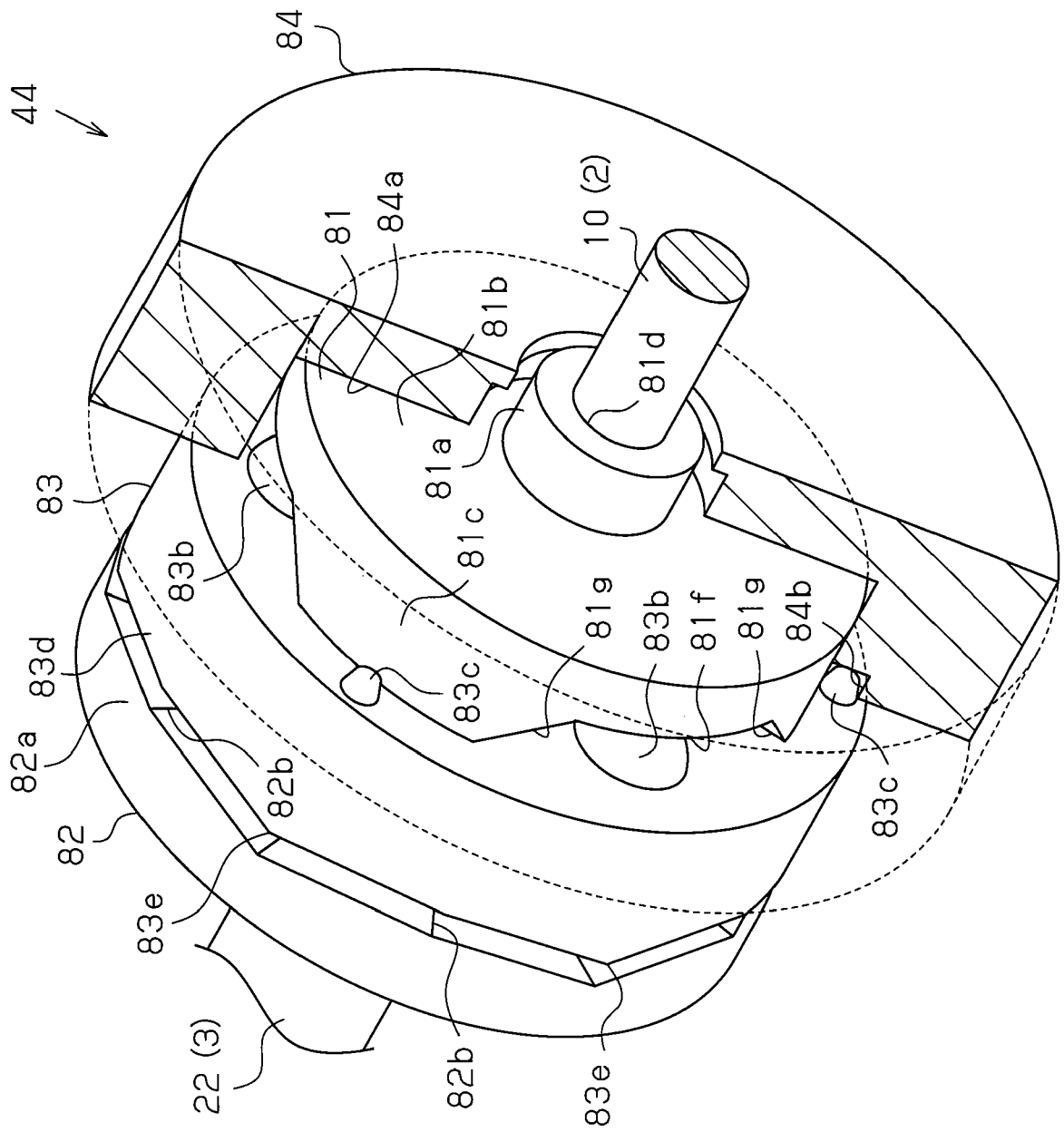
FIG. 27 is a perspective view of the fourth clutch shown in FIG. 26.
Figure 28:
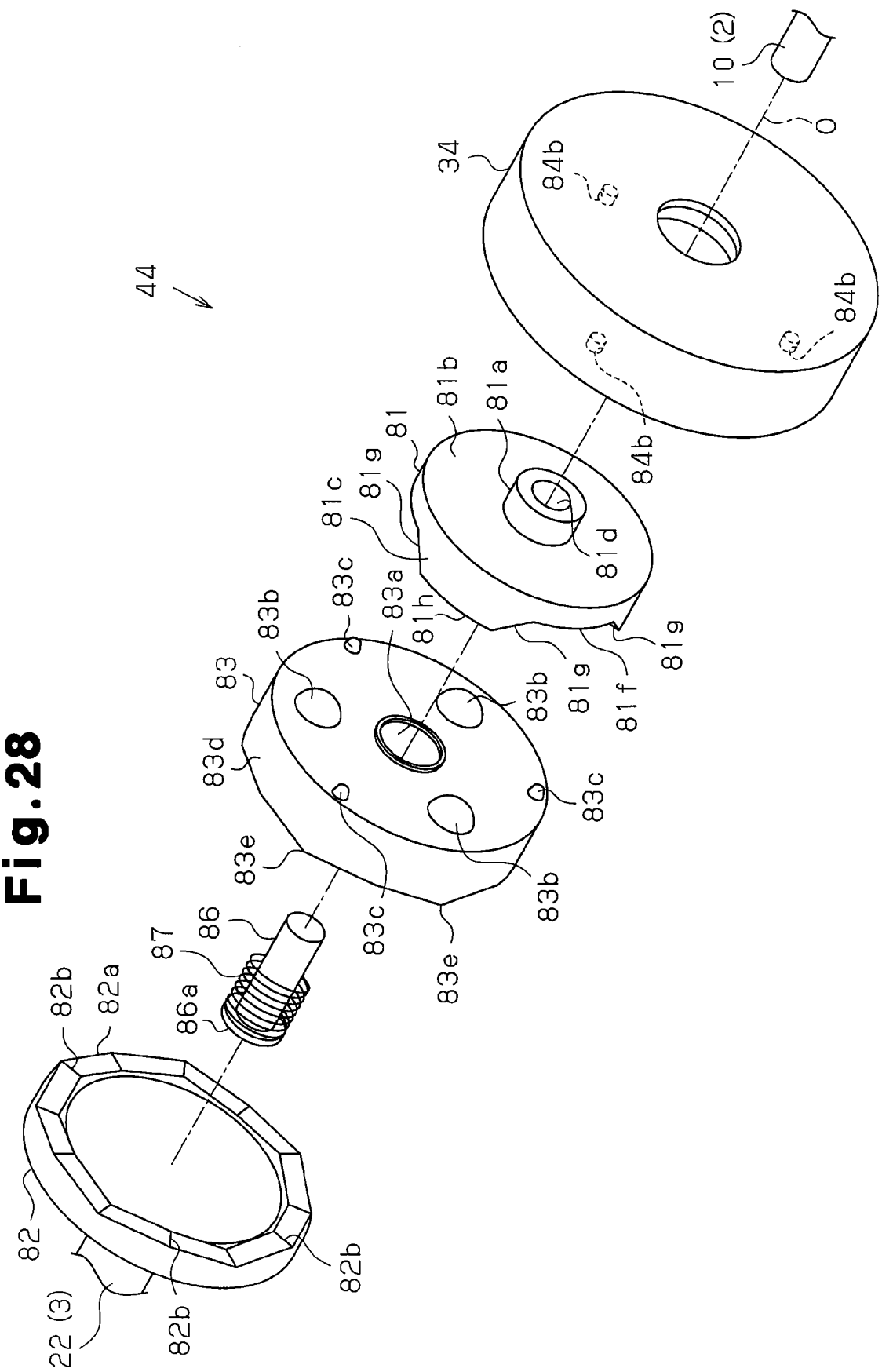
FIG. 28 is an exploded perspective view of the fourth clutch shown in FIG. 27.

A fourth clutch 44 is provided with a drive rotor 81 provided in the rotary shaft 10, a driven rotor 82 provided in the worm shaft 22, and a coupling plate 83, as shown in FIGS. 27 to 29. The coupling plate 83 serves as a coupling member provided between the drive rotor 81 and the driven rotor 82. The drive rotor 81 serves as a first rotor, and the driven rotor 82 serves as a second rotor.

Figure 26:
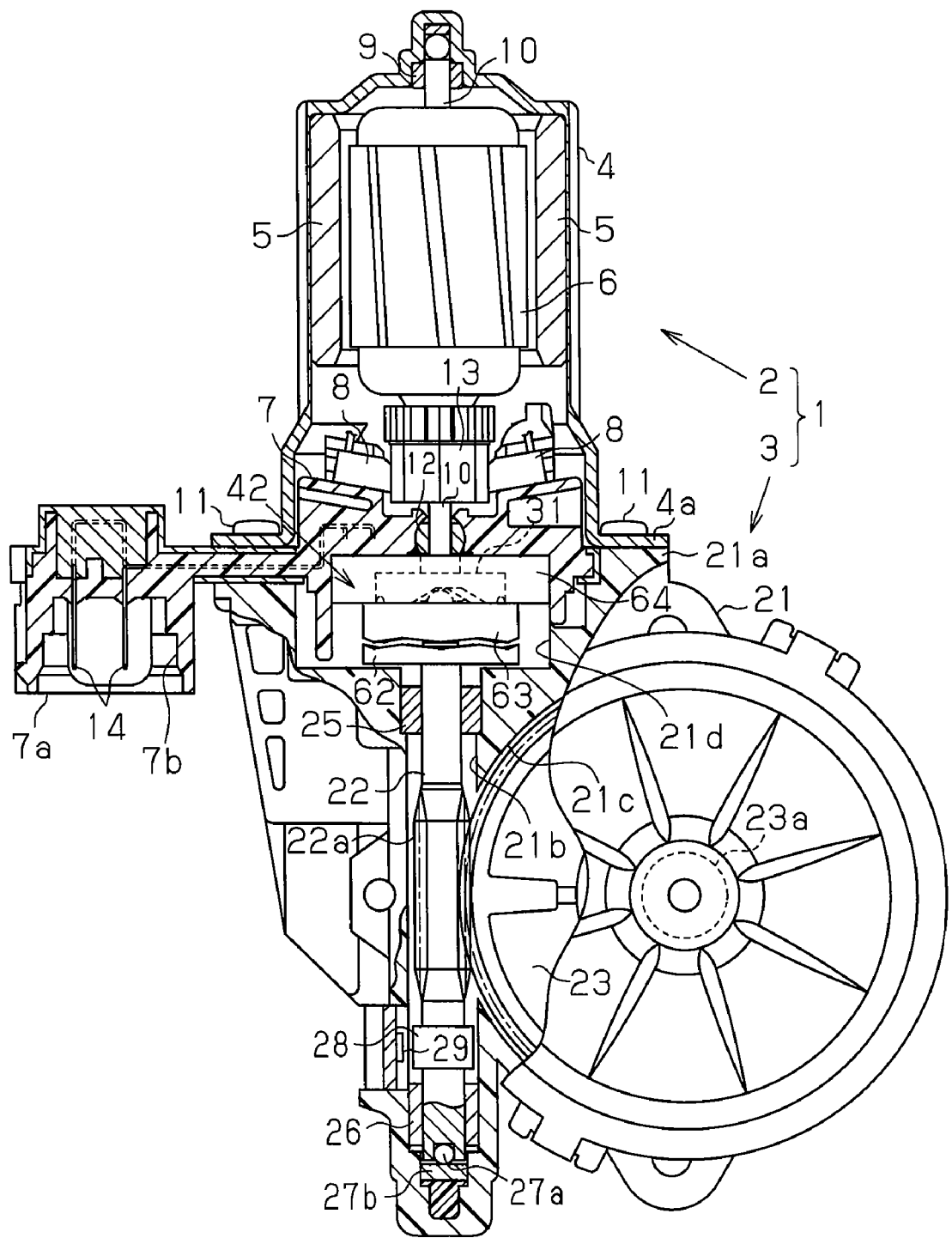
FIG. 26 is a vertical cross-sectional view of a motor device including a fourth clutch in accordance with a fourth embodiment of the present invention.

As shown in FIG. 26, a discoid fixed plate 84 is fixed to the brush holder 7. The fixed plate 84 is not limited to this, but may be integrally formed with the brush holder 7. For example, the fixed plate 84 serving as a base member made of a resin has an accommodating recess 84a having a circular cross-sectional shape. The accommodating recess 84a rotatably accommodates the drive rotor 81. As shown in FIG. 29B, a center of a bottom surface of the accommodating recess 84a accommodates a fifth bearing 85. The fifth bearing 85 rotatably supports a mounting cylinder 81a.

For example, the metal drive rotor 81 has a discoid flange 81b, a mounting cylinder 81a passing through a center portion of the flange 81b, and a drive outer ring 81c protruding in an axial direction from an outer circumferential portion of the flange 81b. The flange 81b is expanded in a radial direction from a center in an axial direction of the mounting cylinder 81a. The drive outer ring 81c protrudes toward an opposite side to the rotary shaft 10 from the flange 81b. In other words, the drive outer ring 81c protrudes toward the coupling plate 83 and the driven rotor 82 from the flange 81b. The mounting cylinder 81a has a first mounting hole 81d to which the rotary shaft 10 is fitted and inserted, and a second mounting hole 81e to which a support pin 86 is fitted and inserted. The drive rotor 81 and the support pin 86 extend coaxially with the rotary shaft 10. The drive rotor 81 is integrally rotated with the rotary shaft 10.

As shown in FIG. 27, the drive outer ring 81c has a drive contact surface 81h which can be brought into contact with the coupling plate 83. The annular drive contact surface 81h faces the coupling plate 83. The drive contact surface 81h has three drive recesses 81f facing the coupling plate 83 at a uniform interval (at an interval of 120 degrees) in a circumferential direction. Each of the drive recesses 81f is defined by a pair of drive inclined surfaces 81g in such a manner as to form a trapezoidal shape expending toward the driven rotor 82. In other words, a pair of drive inclined surfaces 81g correspond to both side surfaces of each of the drive recesses 81f which move away from each other in accordance with being closer to the driven rotor 82.

A support pin 86, for example, made of a metal, is fitted and inserted to the second mounting hole 81e in such a manner as to be coaxial with the drive rotor 81. The support pin 86 inserts the coupling plate 83 thereto. The support pin 86 supports the coupling plate 83 so as to be rotatable and movable in the axial direction. An end of the support pin 86 facing the worm shaft 22 has a flange-shaped locking piece 86a. A coil spring 87 is arranged between the locking piece 86a and the coupling plate 83. The support pin 86 extends through the coil spring 87 thereto. The coil spring 87 serves as an urging member urging the coupling plate 83 toward the drive rotor 81 from the locking piece 86a. A center portion of the locking piece 86a has a semispherical contact protrusion 86b brought into contact with the driven rotor 82.

The coupling plate 83, for example, made of a metal, includes a closed-end coupling cylinder 83d which is open toward the driven rotor 82. The coupling cylinder 83d has a diameter which is somewhat larger than the drive rotor 81. A center of the coupling plate 83 has an insertion hole 83a through which the support pin 86 extends. The coupling plate 83 is supported to the support pin 86 so as to be rotatable and movable in the axial direction. In other words, the coupling plate 83 can be brought into contact with and be detached from the driven rotor 82.

The coupling plate 83 has a first coupling surface 83f facing the drive rotor 81. The coupling cylinder 83d has a second coupling surface 83g facing the driven rotor 82. The first coupling surface 83f has three first locking protrusions 83b at a uniform interval (at an interval of 120 degrees) in a circumferential direction. Each of the semispherical first locking protrusions 83b can be accommodated in the drive recess 81f.

The coupling plate 83 can be moved in an axial direction between a state of being brought into contact with the drive rotor 81 and a state of being brought into contact with the driven rotor 82. Whatever position the position in the axial direction of the coupling plate 83 is, each of the first locking protrusions 83b is positioned within the corresponding drive recess 81f. In other words, the coupling plate 83 can be engaged with the drive rotor 81 in the rotating direction regardless of the position in the axial direction of the coupling plate 83.

The first coupling surface 83f has three second locking protrusions 83c at a uniform interval (at an interval of 120 degrees) in the circumferential direction. Each of the second locking protrusions 83c is positioned between the first locking protrusions 83b and in the outer side in the radial direction than the first locking protrusion 83b. In other words, each of the second locking protrusions 83c is positioned on the concentric circle in an outer side in the radial direction than the drive contact surface 81h, and faces an opening peripheral edge of the accommodating recess 84a. Each of the second locking protrusions 83c is sufficiently smaller than the first locking protrusion 83b. The drive contact surface 81h has three fixed recesses 84b at a uniform interval (at an interval of 120 degrees). Each of the second locking protrusions 83c can be inserted to the corresponding fixed recess 84b. In other words, each of the fixed recesses 84b is positioned on the same circumference as each of the second locking protrusions 83c. The second locking protrusion 83c and the fixed recess 84b serve as a rotation regulating portion regulating the rotation of the coupling plate 83.

The second coupling surface 83g has six third locking protrusions 83e at a uniform interval in the circumferential direction. Each of the third locking protrusions 83e is formed in a triangular shape which somewhat protrudes toward the driven rotor 82.

The driven rotor 82 is formed in a disc shape having the same diameter as the coupling plate 83. The driven rotor 82 is integrally formed in the end of the worm shaft 22. The driven rotor 82 is not limited to this, but may be coupled to the worm shaft 22 after being formed as an independent member from the worm shaft 22. The driven rotor 82 is formed coaxial with the worm shaft 22. Both of the driven rotor 82 and the worm shaft 22 are made of, for example, a metal. An outer circumferential portion of the driven rotor 82 has a driven cylinder 82a which somewhat protrudes toward the coupling plate 83.

The driven cylinder 82a has a driven surface 82c facing the coupling plate 83. The driven surface 82c has six driven protrusions 82b at a uniform interval in the circumferential direction. Each of the driven protrusions 82b can be engaged with a third locking protrusion 83e. Each of the driven protrusions 82b is formed in a triangular shape which is the same shape as the third locking protrusion 83e. The driven protrusion 82b and the third locking protrusion 83e serve as a triangular contact portion protruding so as to be brought into contact with each other. When the coupling plate 83 is brought into contact with the drive contact surface 81h, a gap exists between the driven rotor 82 and the coupling plate 83 in such a manner that the driven rotor 82 comes to a non-coupled state with the coupling plate 83.

Figure 32A:
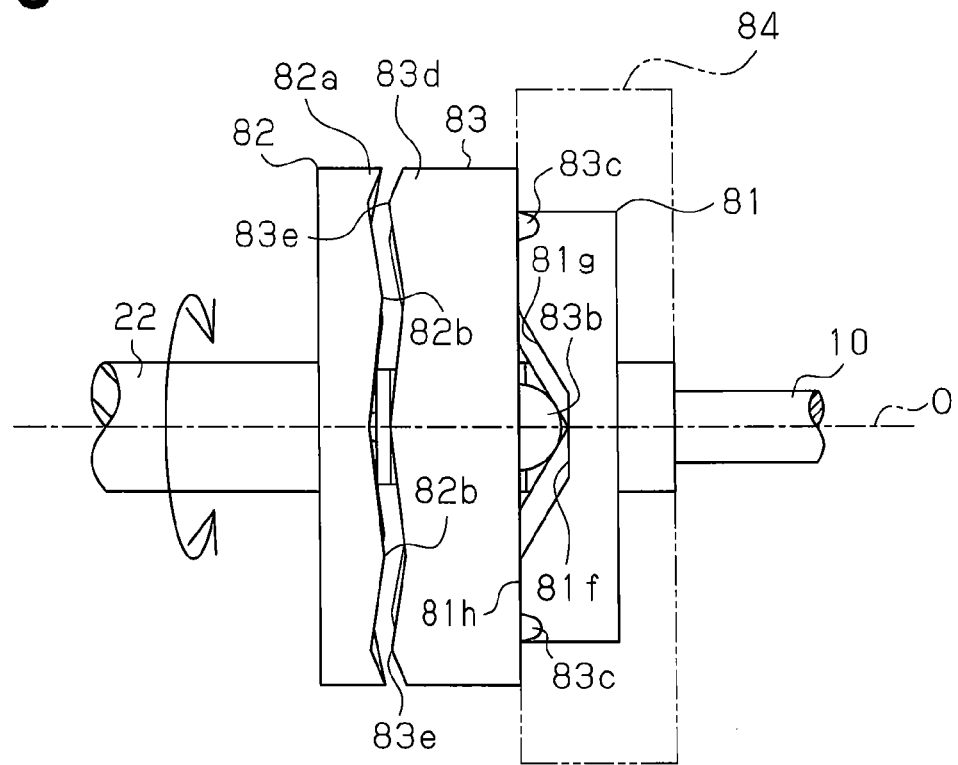
Figure 32B:
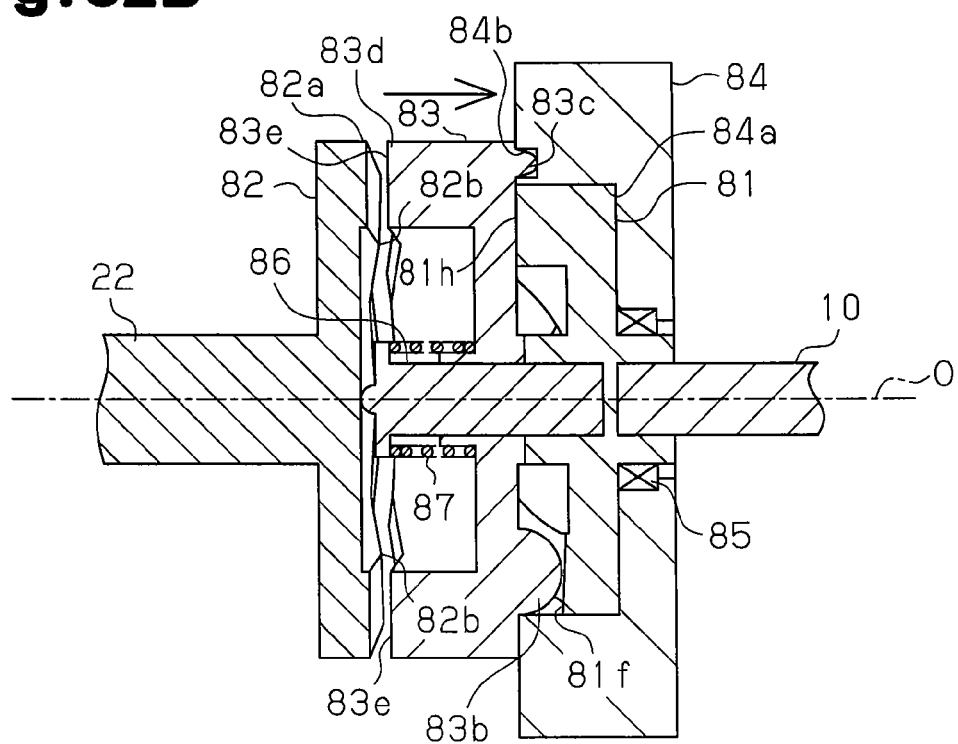

When the motor main body 2 is not driven for manually operating the slide door 52, the coil spring 87 brings the coupling plate 83 into contact with the drive contact surface 81h as shown in FIG. 32B. In this case, each of the drive recesses 81f accommodates the entirety of the corresponding first locking protrusion 83b. Each of the fixed recesses 84b accommodates the entirety of the corresponding second locking protrusion 83c.

As shown in FIGS. 29A, 29B, 32A, and 32B, when the coupling plate 83 is brought into contact with the drive contact surface 81h, the coupling plate 83 is in a non-coupled state with respect to the driven rotor 82. Accordingly, the worm shaft 22 is shut off from the rotary shaft 10. In other words, the rotary load of the output shaft 23a is reduced. Accordingly, the output shaft 23a is easily rotated from the load portion, and the slide door 52 is manually operated easily.

Figure 31A:
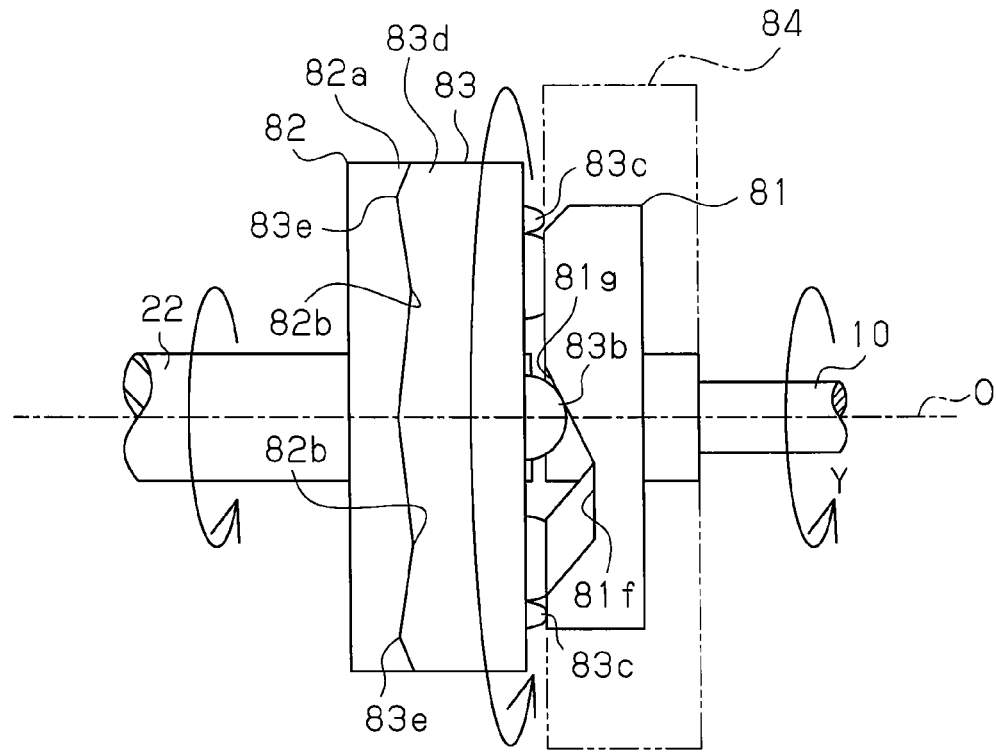
Figure 31B:
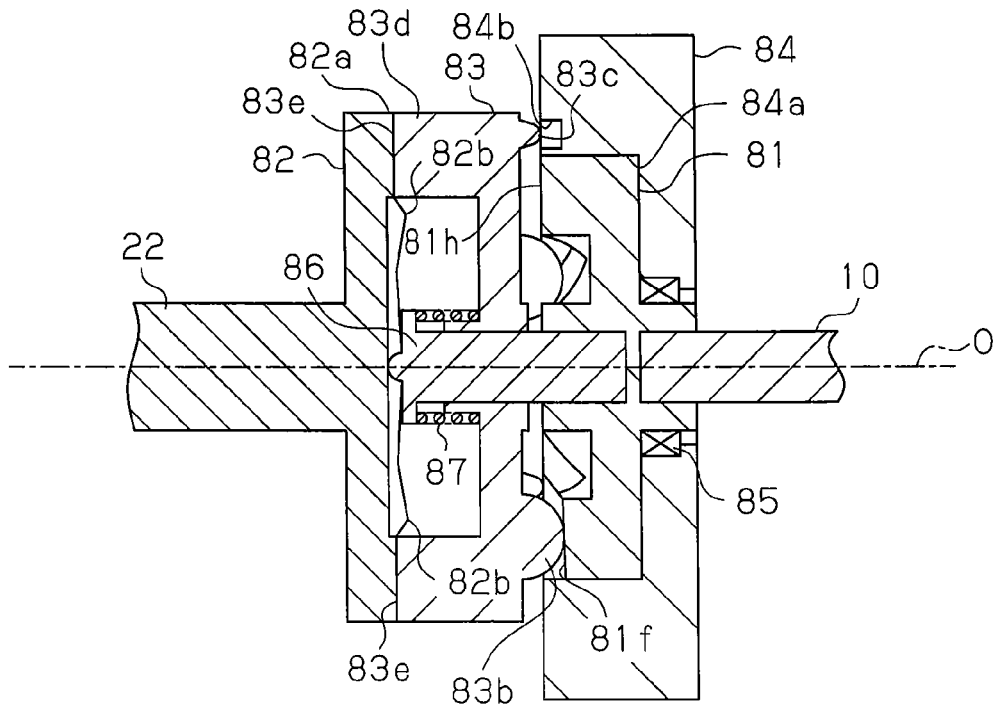

As shown in FIGS. 31A and 31B, when each of the second locking protrusions 83c is disengaged from the fixed recess 84d, if the driven cylinder 82a is rotated so as to be brought into contact with the coupling cylinder 83d at a time when the motor main body 2 is not driven, the coupling cylinder 83d is rotated together therewith by a certain amount. As a result, each of the fixed recesses 84b faces the second locking protrusion 83c and accommodates the second locking protrusion 83c.

As shown in FIGS. 29B and 32B, since each of the fixed recesses 84b accommodates the second locking protrusion 83c, the coupling plate 83 is locked to the fixed plate 84 in the circumferential direction. Therefore, the coupling plate 83 is not rotated. In other words, even if the driven rotor 82 is rotated at a time of manually operating the slide door 52, the coupling plate 83 is prevented from being rotated together therewith.

Figure 29A:
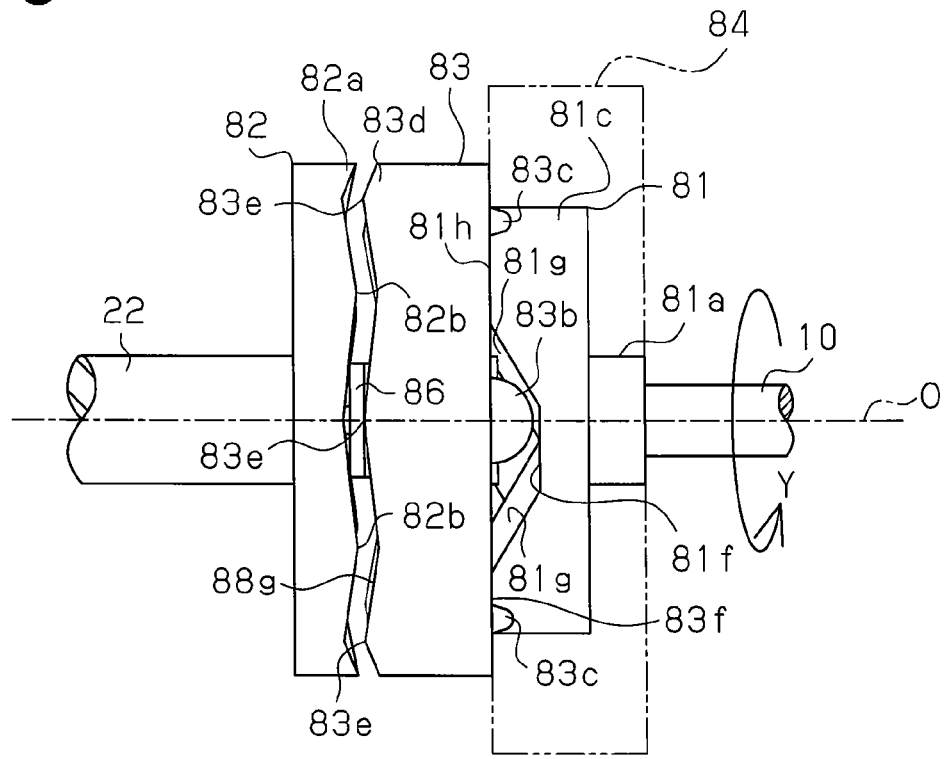
FIG. 29A is a side elevational view of the fourth clutch shown in FIG. 27.
Figure 29B:
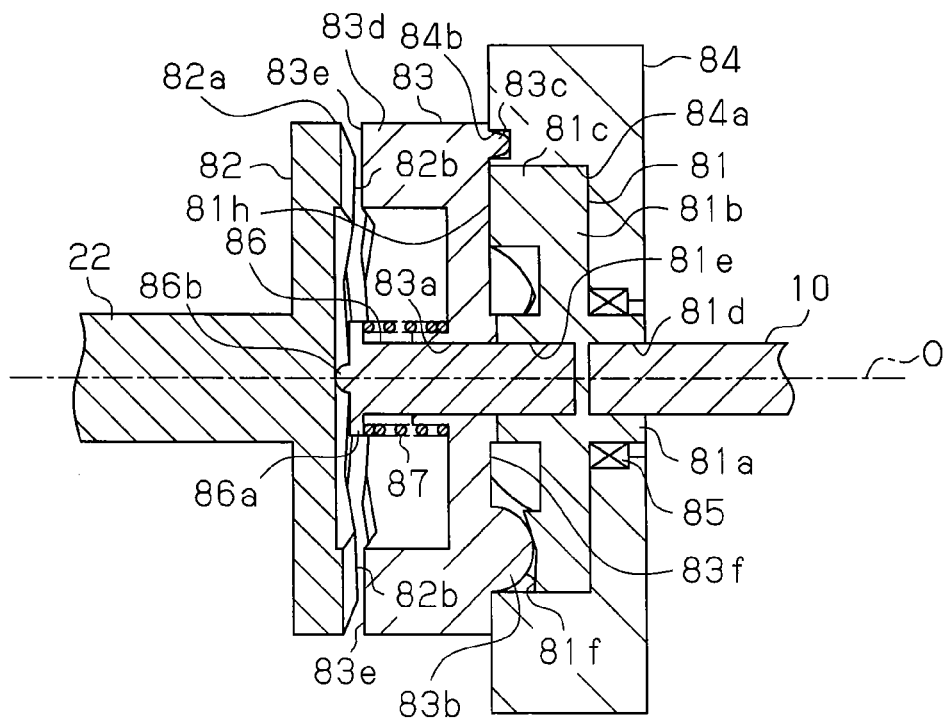
FIG. 29B is a cross-sectional view of the fourth clutch shown in FIG. 29A.

When the motor main body 2 is in the drive state for electrically operating the slide door 52, if the drive rotor 81 is rotated in a rotating direction Y as shown in FIGS. 29A and 29B, each of the first locking protrusions 83b is brought into contact with the drive inclined surface 81g.

Figure 30A:
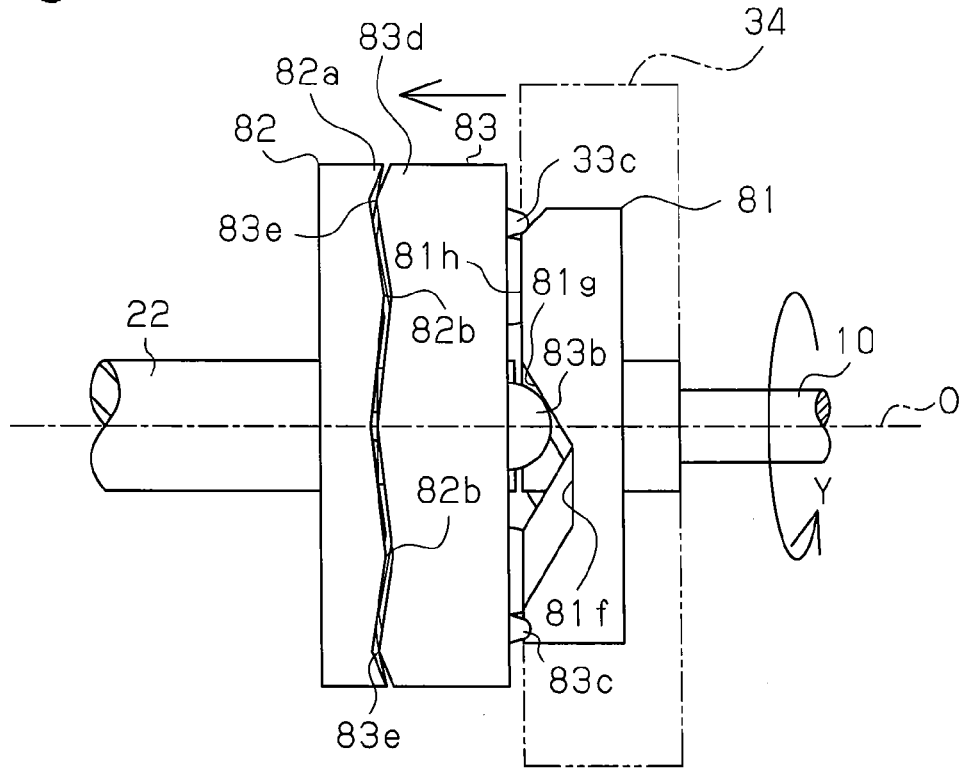
Figure 30B:
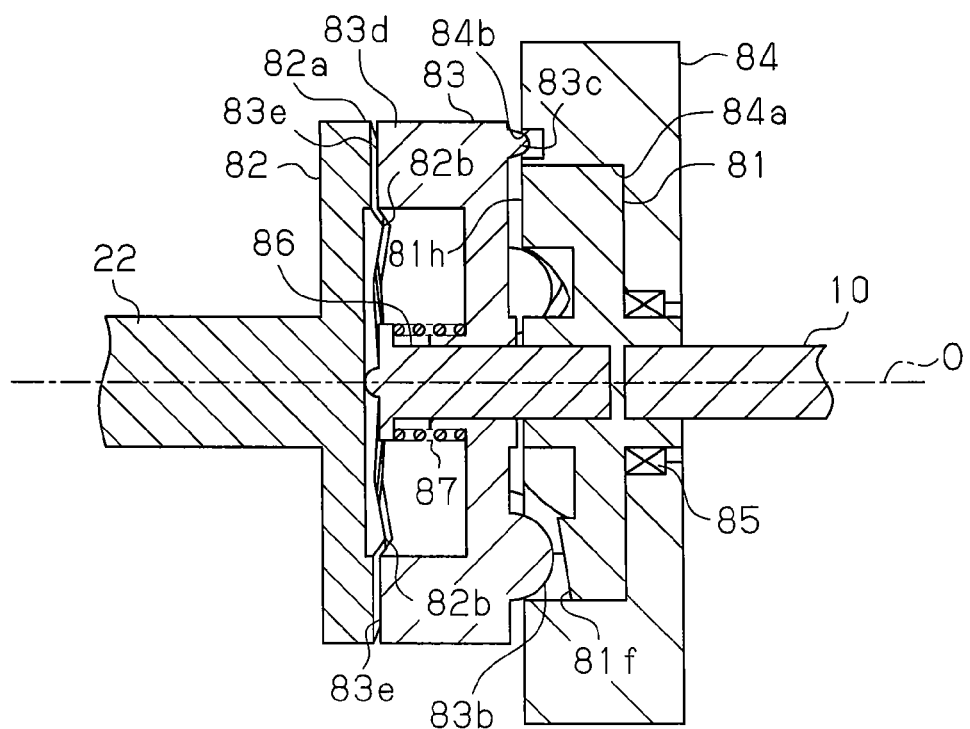

As shown in FIG. 30B, as long as each of the second locking protrusions 83c is accommodated in the fixed recess 84b, even if the drive rotor 81 is further rotated, the coupling plate 83 is not rotated, but is moved in the axial direction so as to approach the driven rotor 82. In other words, the rotating force which the drive inclined surface 81g applies to the first locking protrusion 83b is converted into the urging force in the axial direction, and moves the coupling plate 83 toward the driven rotor 82 against the urging force of the coil spring 87. As a result, each of the second locking protrusions 83c is moved in a direction of being disengaged from the fixed recess 84b.

As shown in FIGS. 31A and 31B, in a state in which the coupling cylinder 83d is brought into contact with the driven cylinder 82a, the third locking protrusion 83e is engaged with the driven protrusion 82b. In this state, the entirety of each of the second locking protrusions 83c is disengaged from the fixed recess 84b. In other words, the rotation of the coupling plate 83 is allowed. As a result, the drive inclined surface 81g rotates the coupling plate 83 and the driven rotor 82 while pressing the coupling plate 83 to the driven rotor 82. The operations in FIGS. 29A to 31B are the same when the drive rotor 81 is rotated in the opposite direction.

As mentioned above, the rotating force of the rotary shaft 10 generated by driving the motor main body 2 is transmitted to the driven rotor 82 via the drive rotor 81 and the coupling plate 83. As a result, the slide door 52 is electrically operated.

If the motor main body 2 is stopped, the coil spring 87 brings the coupling plate 83 into contact with the drive rotor 81, and makes the coupling plate 83 be disconnected from the driven rotor 82, as shown in FIG. 32B. In other words, the worm shaft 22 is returned to the state of being shut off from the rotary shaft 10.

In the case of manually operating the slide door 52, the coil spring 87 makes the coupling plate 83 separate from the driven rotor 82. In other words, the rotary shaft 10 is shut off from the worm shaft 22. Accordingly, it is easy to manually operate the slide door 52.

The fourth embodiment has the following advantages.

(11) If the drive rotor 81 transmits the rotating force to the coupling plate 83 at a time of driving the motor main body 2, the coupling plate 83 is moved in the axial direction. In other words, the coupling plate 83 is moved against the urging force of the coil spring 87 so as to be coupled to the driven rotor 82. Since the coupling plate 83 is coupled to the driven rotor 82, the drive rotor 81 rotates the driven rotor 82 via the coupling plate 83. Since the second locking protrusion 83c is disconnected from the fixed recess 84b, the rotation of the coupling plate 83 is allowed.

At a time when the motor main body 2 is not driven, the fourth clutch 44 is arranged at a position where the coupling plate 83 cannot be locked with the driven rotor 82 in the rotating direction by the urging force of the coil spring 87. Accordingly, the driven rotor 82 is shut off from the drive rotor 81. As a result, the fourth clutch 44 shuts off the rotary shaft 10 and the worm shaft 22 at a time when the motor main body 2 is not driven. Therefore, in the case of manually operating the slide door 52 or the like, it is not necessary to rotate the rotary shaft 10, and it is possible to reduce the load of the manual operation of the slide door 52.

Since the fixed recess 84b accommodates the second locking protrusion 83c, it is possible to prevent an unnecessary rotation of the coupling plate 83. Accordingly, it is easy to prevent an erroneous operation of the fourth clutch 44. As a result, the fourth clutch 44 and the motor device 1 are likely to be stably operated.

(12) The second locking protrusion 83c is formed in the coupling plate 83, and the fixed recess 84b is formed in the fixed plate 84. Since the coupling plate 83 is moved in the axial direction, the second locking protrusion 83c is inserted to or disengaged from the fixed recess 84b. As a result, the rotation of the coupling plate 83 is regulated or allowed. Therefore, it is possible to regulate or allow the rotation of the coupling plate 83 on the basis of the comparatively easy structure.

The fixed plate 84 is fixed to the brush holder 7, which is an existing motor part. Accordingly, any member for fixing the fixed plate 84 is not independently necessary, and it is possible to suppress an increase of the parts of the motor device 1.

(13) The driven rotor 82 and the coupling plate 83 respectively have the driven protrusion 82b and the third locking protrusion 83e protruding so as to be brought into contact with each other. Accordingly, the coupling plate 83 is easily and securely locked to the driven rotor 82 in the rotating direction. A protruding shape of each of the driven protrusion 82b and the third locking protrusion 83e is a triangular shape. Accordingly, the driven protrusion 82b is easily engaged with the third locking protrusion 83e.

Each of the embodiments mentioned above may be modified as follows.

The shapes of the first drive rotor 31, the driven cylinder 32, the roller member 33, and the second drive rotor 34, which form the first clutch 30 mentioned above, may be modified if necessary.

The first drive surface 31a is not limited to be defined by a pair of V-shaped first drive inclined surfaces 31b. For example, the entire first drive surface 31a may be formed in a curved surface.

The number of the guide grooves 31c is not limited to three, but may be modified as necessary.

The structure is made such that the driven recesses 32a are provided in the driven cylinder 32 and the roller member 33 is clamped by the driven recesses 32a. However, the driven recesses 32a may be omitted. Alternatively, roller members 33 may be clamped by inner circumferential surfaces having no recesses or protrusions.

The roller member 33 is not limited to the columnar shape, but may be formed in a spherical shape or an oval cross-sectional shape. The cross section of the roller member 33 may be formed in shapes other than the circular shape.

The number of the roller members 33 provided in the first clutch 30 is not limited to three, but may be set to two or less, or four or more. The number of each of the first drive surface 31a, the driven recess 32a and the second drive recess 34b is set to correspond to the number of the roller member 33.

The number of the insertion projections 34d provided in the second drive rotor 34 is not limited to three, but may be modified as necessary. The guide groove 31c may be provided in the second drive rotor 34, and the insertion projection 34d may be provided in the first drive rotor 31.

The urging member holding the second drive rotor 34 at the predetermined relative rotating position with respect to the first drive rotor 31 is not limited to the coil spring 37, but may be springs other than the coil-shaped spring. The urging member may be formed by elastic material other than a spring.

It is possible to modify, as necessary, the shape of each of the members of the second clutch 42, that is, the drive rotor 61, the driven rotor 62, the contact member 63, the support plate 64, the coil spring 65, and the fixed gear 67. It is possible to modify, as necessary, the shape of each of the members of the third clutch 43, that is the driven rotor 71 and the fixed gear 72. It is possible to modify the number of the contact member 63 and the number or the coil spring 65. The fixed gears 67 and 72 may be omitted.

The drive rotor 61, the contact member 63, the support plate 64 and the fixed gears 67 and 72 are not limited to be made of resin, but may be made of metal. The driven rotor 62 is not limited to be made of metal, but may be made of resin.

The fixed gears 67 and 72 are not limited to be fixed to the brush holder 7, but may be integrally formed in the brush holder 7. In the case of being integrally formed, it is preferable that the fixed gears 67 and 72 be made of the same material as the brush holder 7. Further, the fixed gears 67 and 72 may be fixed to the gear housing 21. The fixed gears 67 and 72 may be made of the same material as the gear housing 21 so as to be integrally formed with the gear housing 21.

It is possible to modify, as necessary, the shape of each of the members of the fourth clutch 44, that is, the drive rotor 81, the driven rotor 82, the coupling plate 83, the support pin 86, and the coil spring 87. The support pin 86 is not limited to be assembled in the drive rotor 81, but may be integrally formed in the drive rotor 81 or the rotary shaft 10. The support pin 86 may be assembled in the driven rotor 82. The support pin 86 may be integrally formed in the driven rotor 82 or the worm shaft 22. It is possible to reverse the recess/protrusion relation between the coupling plate 83 and the drive rotor 81, and the recess/protrusion relation between the coupling plate 83 and the fixed plate 84. The number of the recesses and protrusions may be modified as necessary.

The drive rotor 81, the driven rotor 82, the coupling plate 83 and the support pin 86 are not limited to be made of metal, but may be made of resin. The fixed plate 84 is not limited to be made of resin, but may be made of metal.

The fixed plate 84 is not limited to be fixed to the brush holder 7, but may be integrally formed in the brush holder 7. In this case, it is preferable that the fixed plate 84 be made of the same material as the brush holder 7. The fixed plate 84 may be fixed to the gear housing 21. The fixed plate 84 may be made of the same material as the gear housing 21, and the fixed plate 84 may be integrally formed with the gear housing 21.

The speed reducing mechanism 3 is not limited to the structure having the worm shaft 22 and the worm wheel 23.

The first clutch 30 to the fourth clutch 44 are not limited to be arranged between the rotary shaft 10 and the worm shaft 22, but may be arranged, for example, between the worm wheel 23 and the output shaft 23a. Further, the first clutch 30 to the fourth clutch 44 may be arranged between the output shaft 23a and the drive pulley (not shown) around which the wire cable 55 is wound.

The door opening and closing apparatus 50 in which the motor device 1 is assembled, is not limited to open and close the slide door 52 in the side surface of the vehicle, but may be structured as a vehicle back door opening and closing apparatus for opening and closing a back door in a rear portion of the vehicle. The back door is rotatably supported to the vehicle. In the case of the back door opened and closed in a vertical direction, a comparatively great operating force is necessary for manually opening and closing, in the same manner as the slide door 52. Accordingly, a great significance is obtained by reducing the rotary load of the output shaft 23a on the basis of the shut off of the motor main body 2 with respect to the worm shaft 22 by each of the first clutch 30 to the fourth clutch 44. The motor device 1 may be applied to the other apparatuses than the door opening and closing apparatus 50.

What is claimed is:

1. A clutch arranged between a drive shaft and a driven shaft, in which the driven shaft is arranged coaxially with the drive shaft, the clutch couples the drive shaft to the driven shaft when the drive shaft is in a drive state, the clutch shuts off the driven shaft from the drive shaft when the drive shaft is in a non-drive state, the clutch comprises:
    a first drive rotor which is integrally rotatable with the drive shaft, the first drive rotor being arranged coaxially with the drive shaft;
    a second drive rotor provided coaxially with the first drive rotor;
    an urging member arranged between the first drive rotor and the second drive rotor, the urging member holding the second drive rotor at a predetermined relative rotational position with respect to the first drive rotor;
    a driven rotor which is integrally rotatable with the driven shaft, the driven rotor being arranged coaxially with the driven shaft; and
    a power transmitting member arranged between the first drive rotor and the driven rotor, and between the second drive rotor and the driven rotor, with respect to a radial direction, the power transmitting member being movable among a first clamping position, a second clamping position, and a non-engaging position, the non-engaging position in an inner side in a radial direction than the first clamping position and the second clamping position, the first drive rotor and the driven rotor clamping the power transmitting member located at the first clamping position, the second drive rotor and the driven rotor clamping the power transmitting member located at the second clamping position, the first drive rotor and the driven rotor not clamping the power transmitting member located at the non-engaging position, and the second drive rotor and the driven rotor not clamping the power transmitting member located at the non-engaging position, wherein when the drive shaft is in a non-drive state, the power transmitting member exists at the non-engaging position, so that the second drive rotor is in a non-engaging state with the driven rotor with respect to its own rotating direction, and wherein when the drive shaft is in a drive state, a rotating force of the first drive rotor is transmitted to the second drive rotor through the urging member, so that the second drive rotor is rotated, and the power transmitting member revolves accordingly, a centrifugal force caused by the revolution arranges the power transmitting member at the second clamping position, the second drive rotor receives a reaction force from the driven rotor via the power transmitting member, so that the second drive rotor is relatively rotated in an opposite direction to the rotating direction of the first drive rotor with respect to the first drive rotor, against the urging force of the urging member, and the power transmitting member is arranged at the first clamping position, so that the first drive rotor is engaged with the driven rotor with respect to its own rotating direction.

2. The clutch according to claim 1, wherein the first drive rotor has a first clamping surface, the second drive rotor has a second clamping surface, the driven rotor has a driven clamping surface, the first clamping surface and the driven clamping surface are capable of clamping the power transmitting member located at the first clamping position, and the second clamping surface and the driven clamping surface are capable of clamping the power transmitting member located at the second clamping position, wherein the first clamping surface and the driven clamping surface form a first angle spread toward an outer side in a radial direction of the clutch, and wherein the second clamping surface and the driven clamping surface form a second angle spread toward an inner side in the radial direction of the clutch.

3. The clutch according to claim 1, wherein one of the first drive rotor and the second drive rotor has a guide groove, the other thereof has an insertion projection, the guide groove is formed in an arcuate shape extending in a circumferential direction of the clutch, and the insertion projection is inserted to the guide groove, so that the insertion projection and the guide groove guide a relative rotation of the second drive rotor with respect to the first drive rotor, and wherein the urging member is one of a pair of urging members arranged so as to clamp the insertion projection in each of the guide grooves.

4. The clutch according to claim 1, wherein each of the first drive rotor, the second drive rotor, and the driven rotor has a recess accommodating the power transmitting member.

5. The clutch according to claim 1, wherein the power transmitting member is one of a plurality of power transmitting members arranged at a uniform interval in a circumferential direction of the clutch, and each of the power transmitting members is formed in a columnar shape or a spherical shape.

6. The clutch according to claim 1, wherein when the drive shaft is in the drive state, the clutch couples the drive shaft to the driven shaft whichever direction the drive shaft is rotated, and wherein when the drive shaft is in the non-drive state, the clutch shuts off the driven shaft from the drive shaft whichever direction the driven shaft is rotated.

7. A motor device comprising:

the clutch according to claim 1;

a motor main body driving the drive shaft; and a speed reducing mechanism coupled to the driven shaft, wherein the clutch couples the drive shaft to the driven shaft at a time when the motor main body is driven, and shuts off the driven shaft from the drive shaft at a time when the motor main body is not driven.

* * * * *